(12) United States Patent
Sherwood

(10) Patent No.: US 12,416,372 B2
(45) Date of Patent: Sep. 16, 2025

(54) GUIDE SLEEVE FOR A FLEXIBLE LINEAR MEMBER AND KITS THEREOF

(71) Applicant: Kenneth William Sherwood, St. Catharines (CA)

(72) Inventor: Kenneth William Sherwood, St. Catharines (CA)

( * ) Notice: Subject to any disclaimer, the term of this patent is extended or adjusted under 35 U.S.C. 154(b) by 354 days.

(21) Appl. No.: 18/094,552

(22) Filed: Jan. 9, 2023

(65) Prior Publication Data
US 2023/0358338 A1   Nov. 9, 2023

(30) Foreign Application Priority Data
May 5, 2022  (CA) .............................. CA 3158533

(51) Int. Cl.
| | |
|---|---|
| *F16L 3/015* | (2006.01) |
| *E21B 17/10* | (2006.01) |
| *F16L 1/12* | (2006.01) |
| *F16L 57/06* | (2006.01) |
| *H02G 3/04* | (2006.01) |

(52) U.S. Cl.
CPC ............ *F16L 3/015* (2013.01); *H02G 3/0475* (2013.01); *E21B 17/10* (2013.01); *E21B 17/1057* (2013.01); *F16L 1/123* (2013.01); *F16L 57/06* (2013.01)

(58) Field of Classification Search
CPC ........... F16L 3/015; F16L 1/123; F16L 57/06; H02G 3/0475; E21B 17/10; E21B 17/1057
See application file for complete search history.

(56) References Cited

U.S. PATENT DOCUMENTS

| | | |
|---|---|---|
| 6,992,254 B2 | 1/2006 | Komiya |
| 8,024,916 B2 | 9/2011 | Kuebel |
| 8,122,913 B2 | 2/2012 | Stark |
| 8,450,645 B2 | 5/2013 | Gelmetti |
| 8,739,507 B2 | 6/2014 | Hughes |
| 2021/0222819 A1 | 7/2021 | Shiotani et al. |
| 2022/0127920 A1 | 4/2022 | Wheater et al. |

FOREIGN PATENT DOCUMENTS

WO          9812418 A2     3/1998

*Primary Examiner* — Nicholas L Foster

(57) ABSTRACT

Described herein are guide sleeves and kits for guide sleeves having a plurality of modules. Each module may have an axial extending main body having first and second axially spaced apart opposed ends and an outer sidewall. The modules may also have an axially extending internal opening extending between the first and second axially spaced apart opposed ends for receiving a flexible linear member. Internal rollers may be associated with the internal opening so that as the flexible linear member travels axially through the internal opening, the internal rollers rotate relative to the flexible linear member. When the modules are connected, a first module may be axially moveable with respect to a second module and the guide sleeve may be bendable.

31 Claims, 28 Drawing Sheets

GUIDE SLEEVE FOR A FLEXIBLE LINEAR MEMBER AND KITS THEREOF

CROSS-REFERENCE TO RELATED APPLICATIONS

This application claims benefit of priority under 37 CFR 1.55 to Canadian Patent Application No. 3158533, filed on May 5, 2022, the content of which is incorporated herein by reference.

FIELD

This disclosure relates generally to guide sleeves for flexible linear members. More specifically, to guide sleeves and kits thereof that may protect flexible linear members from abrasion and/or buckling when being pulled into position, e.g., through a conduit or an area in which a person may not be present to assist the flexible linear member to travel around, e.g., corners.

INTRODUCTION

The following is not an admission that anything discussed below is part of the prior art or part of the common general knowledge of a person skilled in the art.

When pulling a flexible linear member such as a rope, cable, wire, hose, optical fiber, tether umbilical, etc. (a flexible linear member may comprise, for example, a single wire or a bundle of wires) around corners and through tight spaces, the flexible linear member may be damaged due to abrasion and/or buckling. This damage may occur when pulling the flexible linear member around corners in an open space such as a building exterior or around interior corners in corridors and utility passages. This damage may also occur when pulling flexible linear members through confined spaces such a pipelines, conduits, tunnels, or passageways regardless of whether the confined spaces are filled with a gas or fluid (e.g., air or water). This damage may also occur when pulling flexible linear members through internal passageways in machines, electronics, and electrical panels and cabinets.

Damage to the flexible linear member during pulling can occur when pulling around a long radius bend or a short radius bend. Pulling around long radius bends may result in greater surface contact area between the surface being navigated and the flexible linear member which may damage the flexible linear member due to wear (e.g., friction). Pulling around short radius bends may result in buckling of the flexible linear member because of the acute bend point.

Systems have been implemented to try limit damage to flexible linear members during pulling operations. For example, roller sheave fairing has been used by electrical utility companies when installing new lines on, for example, hydro poles. Roller sheave fairing has also been used when installing flexible linear members in underwater tunnels.

However, it has been found that roller sheave fairing can be difficult, if not impossible, to install at especially sharp bends and in remote locations, such as those where it may be desirable to use robots to pull the flexible linear members so to not put skilled operators in danger (e.g., in underwater tunnels).

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In one aspect of this disclosure, there is provided a kit for a guide sleeve for a flexible linear member. The kit may comprise:
(a) a plurality of modules comprising a first module and a second module wherein, when assembled and the modules are linearly arrayed and the guide sleeve extends along a longitudinal axis, each module comprising an axial extending main body comprising:
  (i) first and second axially spaced apart opposed ends and an outer sidewall;
  (ii) an axial extending internal opening extending between the first and second axially spaced apart opposed ends;
  (iii) internal guide members associated with the internal opening wherein, as the flexible linear member travels axially through the internal opening and contacts the internal guide members, the internal guide members move relative to the flexible linear member whereby friction between the internal opening and the flexible linear member is reduced; and,
  (iv) external guide members associated with the outer sidewall, the external guide members:
    (1) have an outer surface comprising a face that has at least one of a shape comparable to an inner surface of a conduit, a textured surface and a frictional coating whereby contact between the face and the inner surface of the conduit inhibits the modules from travelling through the conduit as the flexible linear member travels through the modules, or
    (2) are moveably mounted with respect to the modules whereby the external guide members move relative to the inner surface of the conduit as the guide sleeve travels through the conduit whereby friction between the module and the inner wall of the conduit is reduced,
wherein, when the first module is connected to the second module, the first module is axially moveable with respect to the second module and the guide sleeve is bendable whereby the first module is moveable off axis with respect to the second module.

In another aspect of this disclosure, there is provided a kit for a guide sleeve for a flexible linear member. The kit may comprise:
(a) a plurality of modules comprising a first module and a second module wherein, when assembled and the modules are linearly arrayed and the guide sleeve extends along a longitudinal axis, each module comprising an axial extending main body comprising:
  (i) first and second axially spaced apart opposed ends and an outer sidewall;
  (ii) an axial extending internal opening extending between the first and second axially spaced apart opposed ends; and,
  (iii) internal rollers associated with the internal opening wherein, as the flexible linear member travels axially through the internal opening, the internal rollers rotate relative to the flexible linear member,
wherein, when the first module is connected to the second module, the first module is axially moveable with respect to the second module and the guide sleeve is bendable whereby the first module is moveable off axis with respect to the second module.

In another aspect of this disclosure, there is provided a guide sleeve for a flexible linear member. The guide sleeve may comprise:

(a) a plurality of modules comprising a first module and a second module, each module comprising an axial extending main body comprising:
   (i) first and second axially spaced apart opposed ends and an outer sidewall;
   (ii) an axial extending internal opening extending between the first and second axially spaced apart opposed ends;
   (iii) internal guide members associated with the internal opening wherein, as the flexible linear member travels axially through the internal opening, the internal guide members move relative to the flexible linear member whereby friction between the internal opening and the flexible linear member is reduced; and,
   (iv) external guide members associated with the outer sidewall wherein, the external guide members:
      (1) have an outer surface comprising a face that has at least one of a shape comparable to an inner surface of the conduit, a textured surface and a frictional coating whereby contact between the face and the inner surface of the conduit inhibits the modules from travelling through the conduit as the flexible linear member travels through the modules, or
      (2) are moveably mounted with respect to the modules whereby the external guide members move relative to the inner surface of the conduit as the guide sleeve travels through a conduit whereby friction between the module and the inner surface of the conduit is reduced; and,
(b) a plurality of axially extending linking members wherein, when the first module is connected to the second module, the axially extending members connect the first and second modules and enable the first module to move axially with respect to the second module.

It will be appreciated by a person skilled in the art that an apparatus, kit, or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1A:
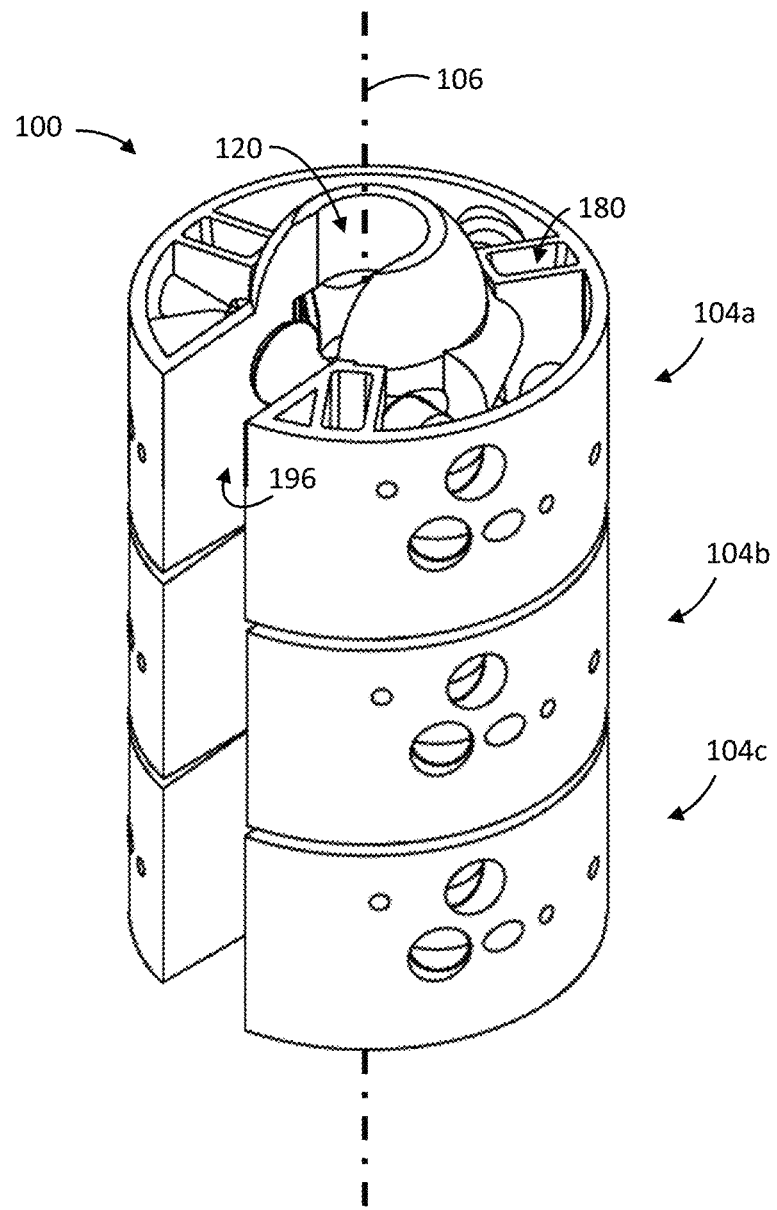
FIG. 1A shows a perspective view of a guide sleeve.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatuses will be described below to provide an example of an embodiment of each claimed invention. No embodiment described below limits any claimed invention and any claimed invention may cover apparatuses that differ from those described below. The claimed inventions are not limited to apparatuses having all of the features of any one apparatus described below or to features common to multiple or all of the apparatuses described below. It is possible that an apparatus described below is not an embodiment of any claimed invention. Any invention disclosed in an apparatus described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment", "embodiment", "embodiments", "the embodiment", "the embodiments", "one or more embodiments", "some embodiments", and "one embodiment" mean "one or more (but not all) embodiments of the present invention(s)," unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

As used herein and in the claims, a group of elements are said to "collectively" perform an act where that act is performed by any one of the elements in the group, or performed cooperatively by two or more (or all) elements in the group.

As used herein and in the claims, a first line or axis is said to be "perpendicular" to a second line or axis in three dimensional space when the second line or axis is parallel to or collinear with an imaginary line that intersects the first line at a 90 degree angle, or within an angle of about 5 degrees of parallel to or collinear with the imaginary line.

Some elements herein may be identified by a part number, which is composed of a base number followed by an alphabetical or subscript-numerical suffix (e.g., $112a$, or $112_1$). Multiple elements herein may be identified by part numbers that share a base number in common and that differ by their suffixes (e.g., $112_1$, $112_2$, and $112_3$). All elements with a common base number may be referred to collectively or generically using the base number without a suffix (e.g., 112).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1% 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

General Description of a Guide Sleeve for a Flexible Linear Member

Figure 2A:
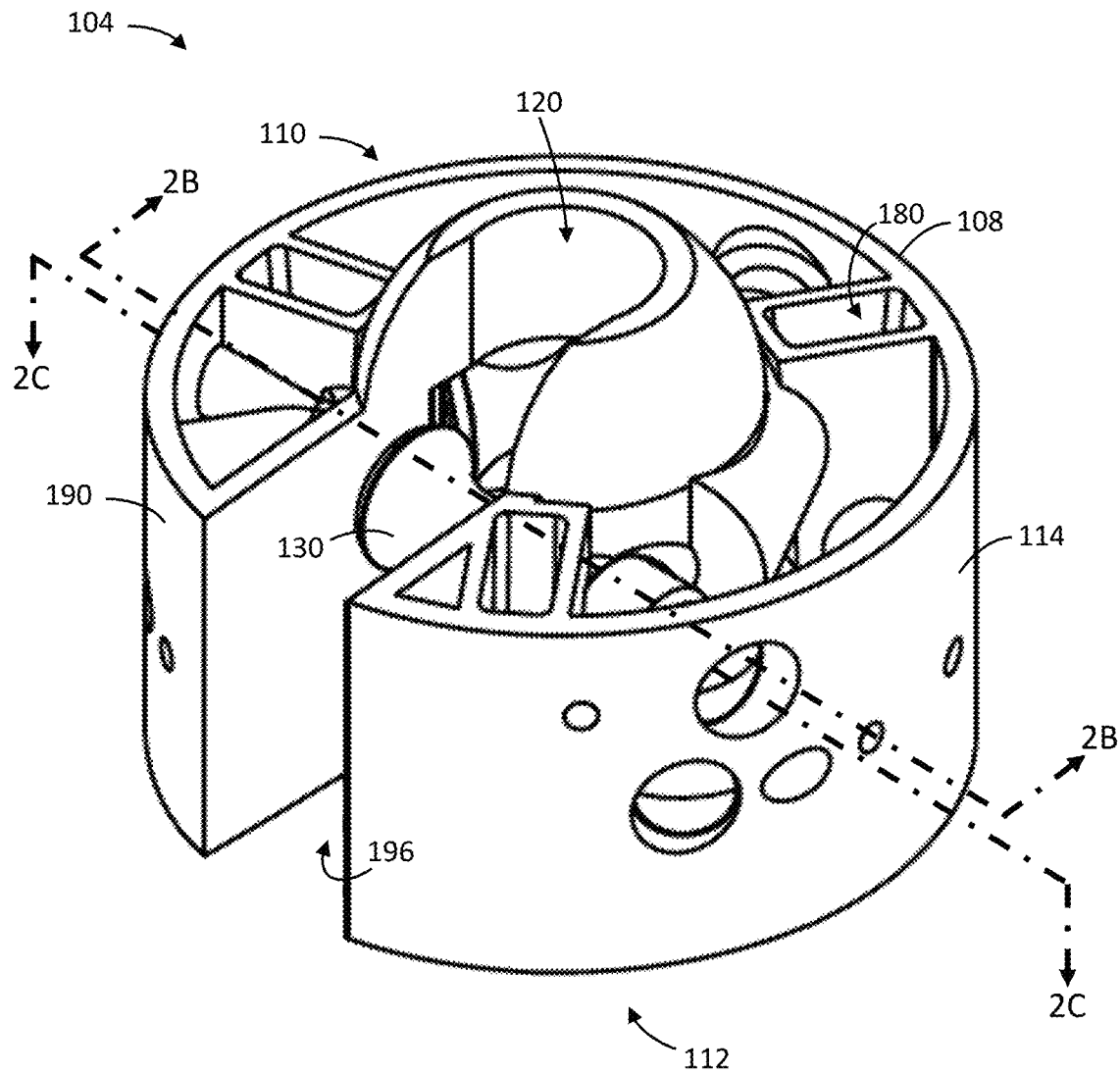
FIG. 2A shows a perspective view of a module of the guide sleeve of FIG. 1A.

FIG. 1A shows a perspective view of a guide sleeve 100 for a flexible linear member 102. FIG. 2A shows the guide sleeve 100 of FIG. 1A with a flexible linear member 102 inserted therein.

As shown in FIG. 1A, the guide sleeve 100 has a plurality of modules 104. In the example illustrated, the modules 104 are linearly arrayed and the guide sleeve 100 extends along a longitudinal axis 106. As shown each module 104 of the plurality of modules 104 may connect to an adjacent module 104 to form the guide sleeve 100. Any means known in the art for connecting a first module 104a to an adjacent second module 104b may be used.

The guide sleeve 100 may include any number of modules 104, for example, two modules 104, ten modules 104, two hundred modules 104, etc. In the example illustrated in FIG. 1A, the guide sleeve 100 includes three modules 104a, 104b, 104c. As shown in FIG. 1A, the guide sleeve 100 may be formed of a plurality of identical modules 104. Alternatively, the guide sleeve 100 may have at least one module 104 having a first set of features in accordance with the described embodiments herein and at least a second module 104 having a second set of features in accordance with the described embodiments herein.

Referring now to FIG. 2A, shown therein is an example of a module 104. In the example illustrated, the module 104 has an axially extending main body 108. As shown, the main body 108 may include a first end 110 and a second end 112 axially spaced apart from and opposed to the first end 110. An outer sidewall 114 may extend between the first and second ends 110, 112.

Still referring to FIG. 2A, in the example illustrated, the main body 108 of the module 104 includes an axially extending internal opening 120. As shown, the internal opening 120 may extend between the first and second ends 110, 112. Referring back to FIG. 1B, the flexible linear member 102 may be insertable into the internal opening 120 of the module 104. When inserted into the internal opening 120 of the module 104, the flexible linear member 102 may be protected when being pulled into place. In addition, as described in more detail below, the guide sleeve 100 may limit the bend radius of the flexible linear member 102 during pulling, which may reduce the likeliness of damage to the flexible linear member 104 due to over bending (i.e., buckling).

Figure 1B:
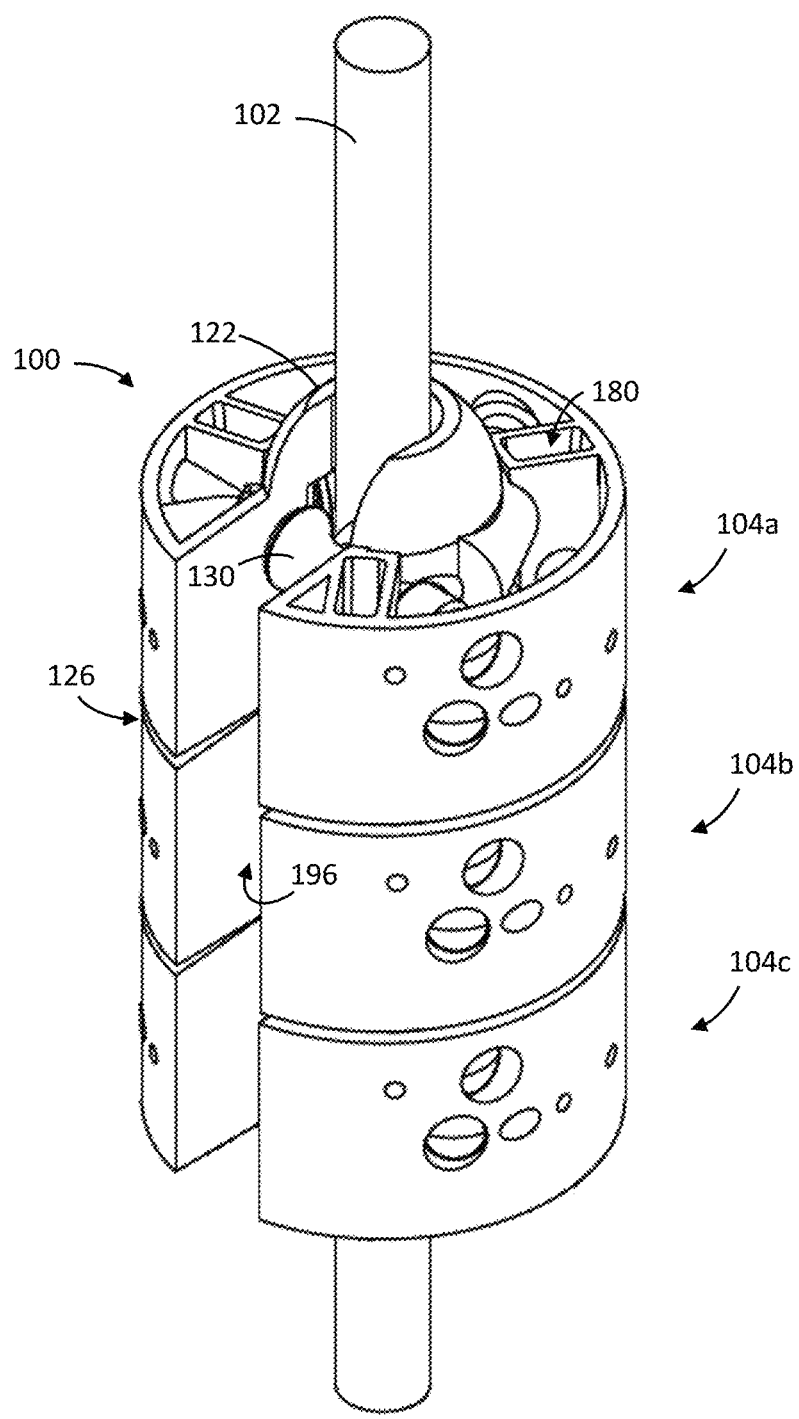
FIG. 1B shows a perspective view of the guide sleeve of FIG. 1A with a flexible linear member extending therethrough.
Figure 2B:
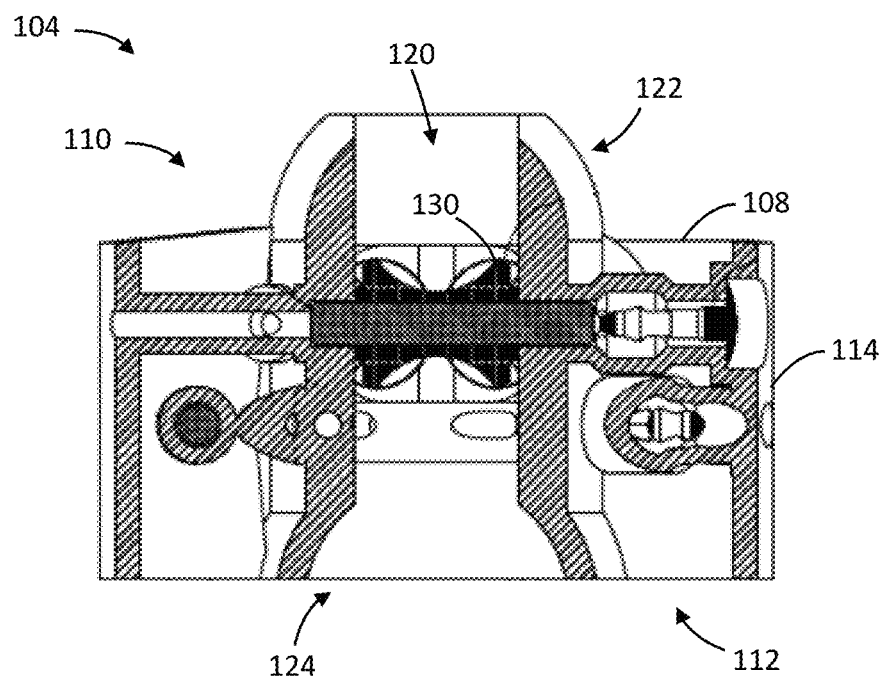
FIG. 2B shows a cross-sectional view of the module of FIG. 2A, taken along line 2B-2B in FIG. 2A.

As shown in FIG. 2B, the first end 110 of each module 104 may have a male member 122 and the second end 112 of each module may have a female member 124. When the guide sleeve 100 is assembled, as illustrated in FIG. 1A, the male member 122 of the second module 104b may be received partially or fully by the female member 124 of the first module 104a. As shown in FIG. 1B, when modules 104 have male members 122 that are receivable by female members 124, the likeliness of a foreign object extending through a gap 126 between adjacent modules 104 and piercing the flexible linear member 102 extending therethrough may be reduced.

In the example illustrated in FIG. 1B, the male member 122 and the female member 124 provide a ball and socket interface between the first and second modules 104*a*, 104*b* and between second and third modules 104*b*, 104*c*. An advantage of a ball and socket interface is that one module may be able to bend in any direction with respect a second module.

Figure 2C:
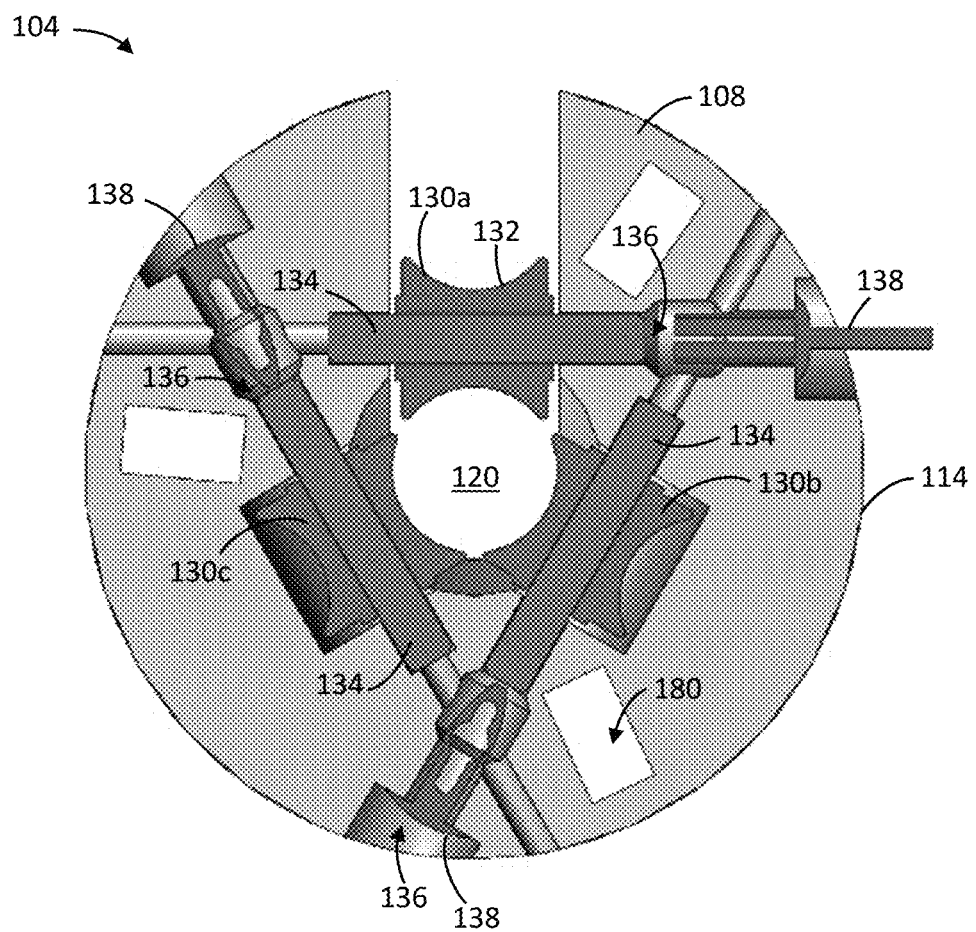
FIG. 2C shows a cross-sectional view of the module of FIG. 2A, taken along line 2C-2C in FIG. 2A.

Referring now to FIG. 2C, the module 104 may include a plurality of internal guide members 130 associated with the internal opening 120. The internal guide members provide an interface between the flexible linear member 102 and a module 104 so as to reduce or essentially eliminate friction between the flexible linear member 102 and a module 104 as the flexible linear member 102 travels through the internal opening 120 of a module 104. The internal guide members 130 may be any internal guide members 130, or combination of internal guide members 130, known in the art. In the example illustrated in FIG. 2B, each internal guide member 130 is a roller 132. Accordingly, as the flexible linear member 102 travels through the internal opening 120 of a module 104, the rollers may rotate thereby reducing friction between the between the flexible linear member 102 and the module 104.

The internal guide members 130 may be used by themselves or in combination with external guide members 140 and/or the interconnection of modules 104 to be axially and, optionally, bendable connected to each other.

The internal guide members 130 may contact the flexible linear member 102 as the flexible linear member 102 travels axially through the internal opening 120. The internal guide members 130 may move relative to the flexible linear member 102 (e.g., roll) to reduce the amount of friction exerted on the flexible linear member 102 by the module 104. Accordingly, optionally, the internal guide members 130 are the only, or substantially the only, portion of the module 104 that the flexible linear member 102 contacts as the flexible linear member 102 passes through the internal opening 102.

It will be appreciated that, the perimeter of the internal opening 120 may be partially or fully defined by the internal guide members 130. The module 104 may include any number of internal guide members 130. In the example illustrated in FIG. 2C, the module 104 includes three internal guide members 130*a*, 130*b*, 130*c*. The guide members 130 may be positioned to engage the flexible linear member 102 as the flexible linear member 102 travels through the internal opening 120. Therefore, for example, depending on the diameter of the flexible linear member 102 and the diameter of the rollers, more or fewer rollers may be provided such that the flexible linear member 102 only contacts the rollers as the flexible linear member 102 travels through the internal opening 120.

A guide sleeve 100 may have at least one module 104 having a first type of internal guide members 130 associated with the internal opening 120 and at least a second module 104 (*a*) not having internal guide members 130; or (b) having an alternative type of internal guide members 130 associated with the internal opening 120; or (c) having the same type of internal guide members.

The internal guide members 130 may be held in place by any means known in the art. In the example illustrated in FIG. 2B, each roller 132 is supported by an axle 134. As shown in FIG. 2C, each axle 134 may be supported within a respective bore 136 in the main body 108. Optionally, as shown, the bore 136 supporting the axle 134 may extend to the outer sidewall 114 of the main body 108. When the bore 136 extends to the outer sidewall 114 of the main body 108, an operator may, for example, replace a damaged axle 134, if desired, or remove the axle 134 to replace or substitute an alternative internal guide member 130. In the example illustrated, a plug 138 is insertable into the bore 136 to secure the axle 134 therein.

Each module 104 may alternately or in addition include a plurality of external guide members 140 associated with the outer sidewall 114. The external guide members 140 may be any external guide members 140, or combination of external guide members 140, known in the art. The configuration of the external guide members 140 associated with the outer sidewall 114 may depend on the desired use of the guide sleeve 100. For example, it may be desirable to hold the guide sleeve 100 stationary relative to an external surface (not shown) (e.g., an inner surface of a conduit, a rockface, a corridor wall, etc.) and therefore it may be desirable for the external guide members 140 to limit relative motion between the external surface and the guide sleeve 100. Alternatively, it may be desirable for the guide sleeve 100 to, for example, slide along the external surface and therefore it may be desirable for the external guide members 140 to reduce the amount of friction exerted on the external surface by the guide sleeve 100.

The external guide members 140 may be used by themselves or in combination with the internal guide members 130 and/or the interconnection of modules 104 to be axially and, optionally, bendable connected to each other.

A guide sleeve 100 may have at least one module 104 having a first type of external guide members 140 associated with the outer sidewall 114 and at least a second module 104 having (a) no external guide members 140; or (b) having an alternative type of external guide members 140 associated with the outer sidewall 114; or (c) having the same type of external guide members 140.

The external guide members 140 may be formed of a unitary workpiece or may be formed of a plurality of separate components. For example, as shown in FIG. 3C, the external guide members 140 are formed of a unitary workpiece (e.g., external guide members 140 may be integrally formed as a separate unitary body that is then applied to a main body 108) whereas in the example shown in FIG. 4C, the external guide members 140 are separate components. Alternately, they may be integrally formed as part of the main body 108.

In order to hold the guide sleeve 100 stationary relative to an external surface, the external guide members 140 may be configured to increase the friction between the module 104 and the external surface. In order to increase the frictional engagement between the module 104 and the external surface, the contact surface area may be increased and/or a material having a higher coefficient of friction may be provided and/or may be shaped to increase the contact pressure between the module and the external surface.

Figure 3A:
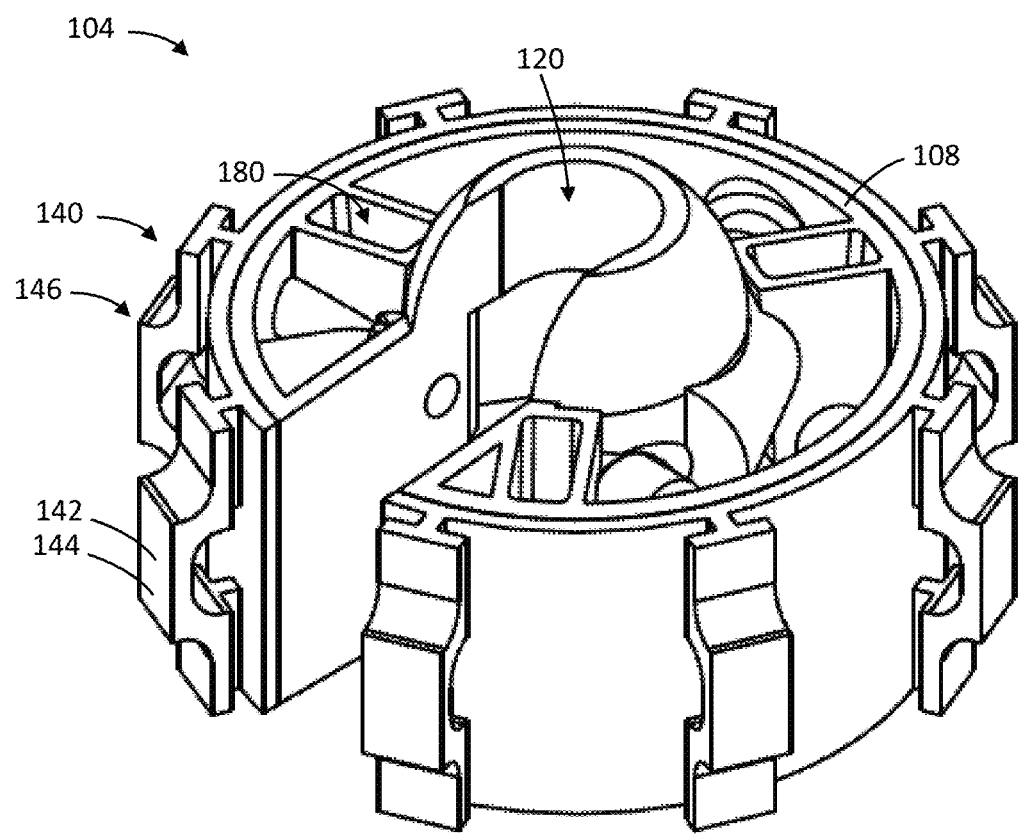
FIG. 3A shows a perspective view of an alternative embodiment of a module.
Figure 3B:
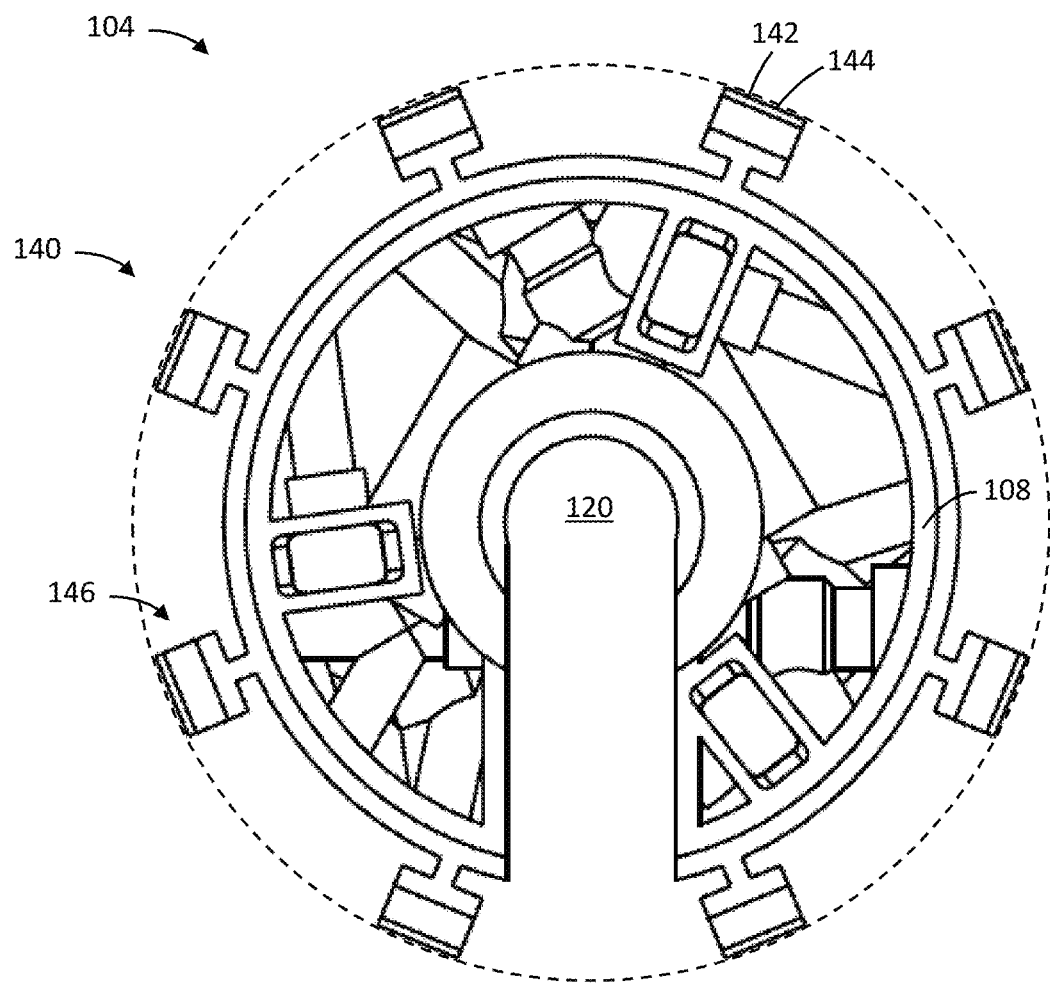
FIG. 3B shows a top view of the module of FIG. 3A.
Figure 3C:
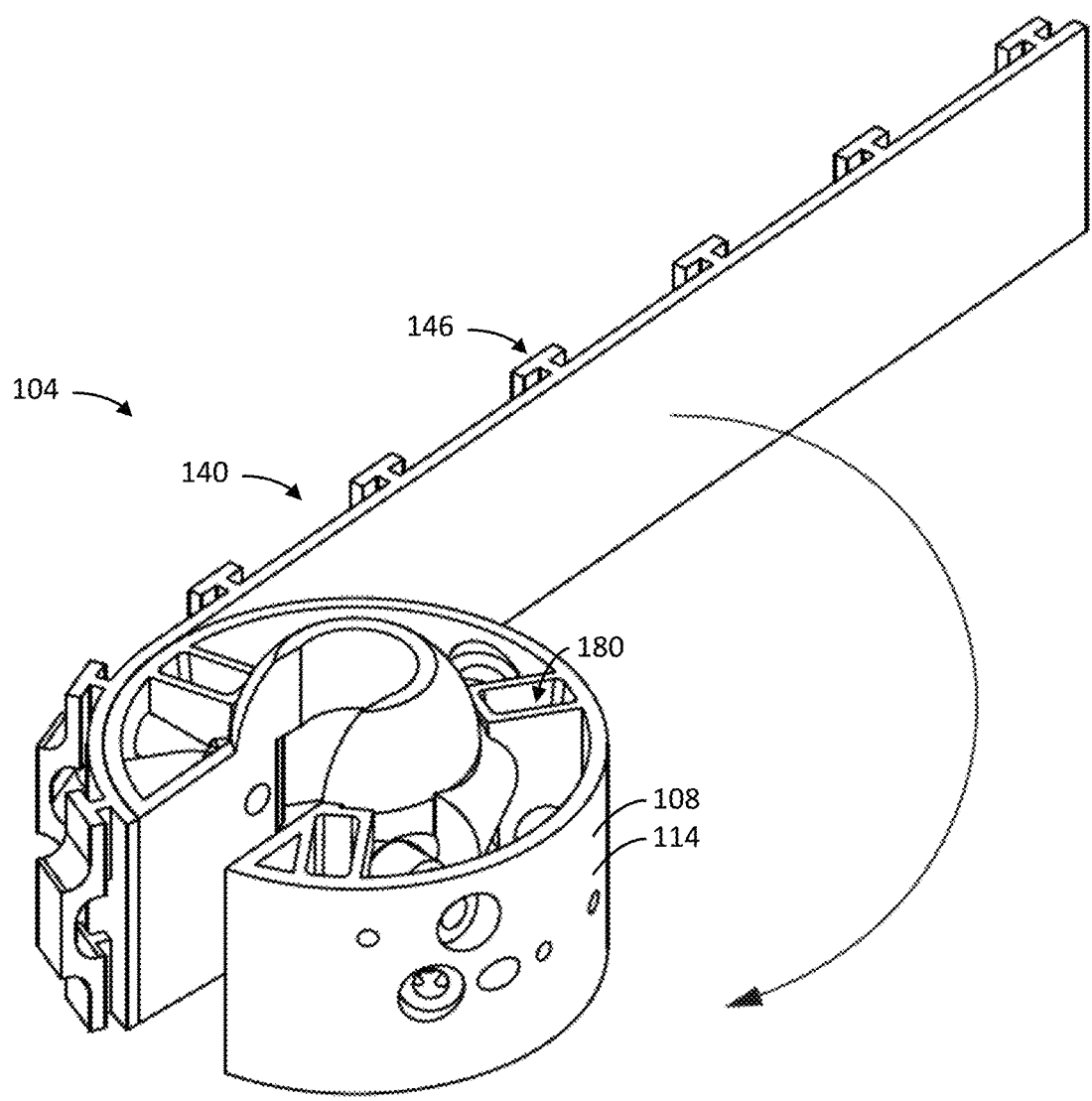
FIG. 3C shows a perspective view of the module of FIG. 3A, shown with external guide members being installed thereon.

Referring to FIG. 3A, shown therein is an example of a module 104 with external guide members 140 associated with the outer sidewall 114 to increase friction between the external surface and the guide sleeve 100. In the example illustrated, the external guide members 140 have an outer surface 142 having a face 144 having a shape comparable to an inner surface of a cylindrical conduit (see, e.g., FIG. 3B). More specifically, in the example illustrated, the external guide members 140 includes a plurality of feet 146 which collectively have a face 144 having a shape comparable to an inner surface of a cylindrical conduit. In other examples, the external guide members 140 may collectively have a face 144 having a shape comparable to an inner surface of a triangular or rectangular conduit. That is, the external guide members 140 may collectively have a face 144 having a shape comparable to any shape known in the art. While these feet 146 may collectively have a face 144 having a shape comparable to an inner surface of a conduit, the feet 146 may grip other surfaces, such as a floor and/or wall in a corridor, for example. By using a face 144 that is shaped comparable to the external surface, the contact surface area between the module 104 and the external surface may be increased.

In the example illustrated in FIG. 3A, the feet 146 are made of a soft material for gripping (e.g., rubber). When formed of a soft material, the feet 146 may flex during installation of the guide sleeve 100. The soft surface may have a higher coefficient of friction than the material from which the main body 108 is formed.

It will be appreciated that the external guide members 140 may be any member that provides enhanced frictional engagement with the external surface. For example, some or all of the outer surface of the main body 108 may be coated with rubber or the like. The coating may be a single continuous layer of a material with a high coefficient of friction. The layer may have a smooth outer surface. Alternately, as exemplified by feet 146, a member (e.g., feet 146) having a raised (radially outwardly) surface that partially or fully matches the profile of the external surface may be provided wherein the raised surface is a higher friction contact surface. Using feet 146 that are made of, or coated with, rubber or the like enhances the frictional engagement between the module and the external surface.

Figure 4A:
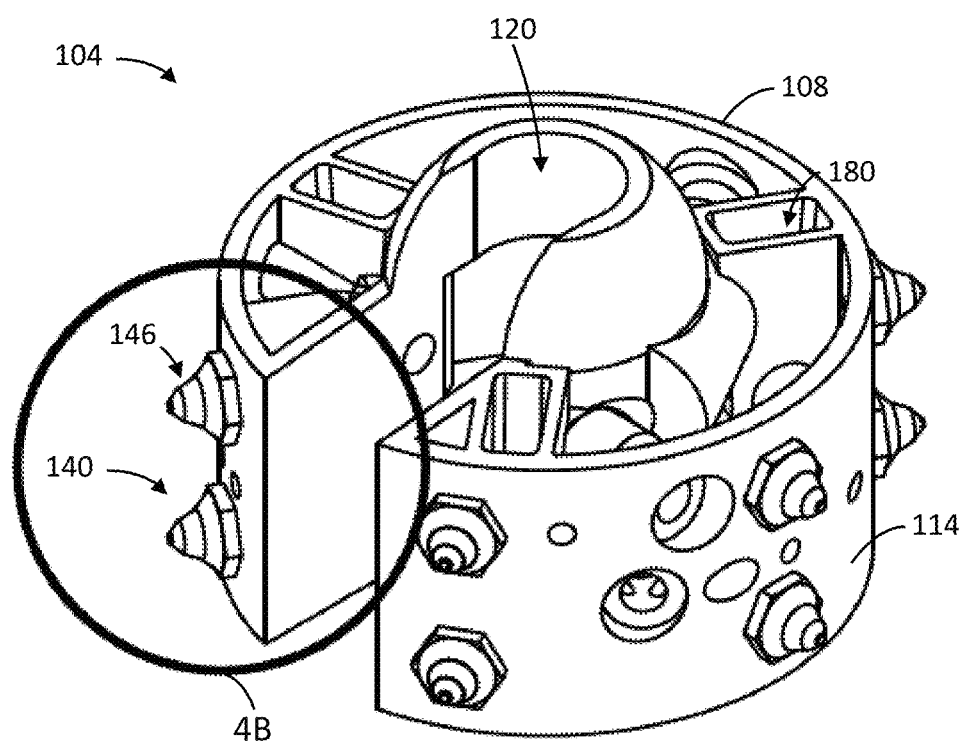
FIG. 4A shows a perspective view of a further alternative embodiment of a module.
Figure 4B:
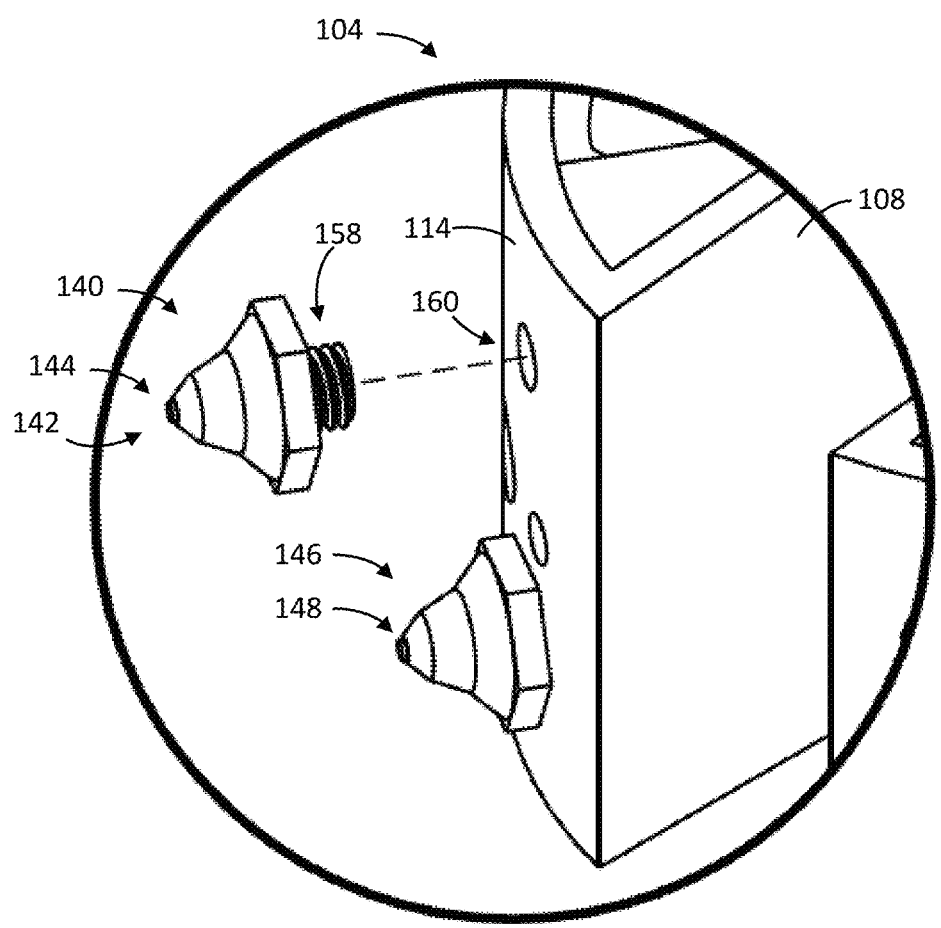
FIG. 4B shows an enlarged perspective view of region 4B in FIG. 4A, shown with external guide members being installed thereon.

An alternative embodiment of a foot 146 is shown in FIG. 4A. In the example illustrated in FIG. 4A, each foot 146 is configured as a cleat. That is, each foot 146 has a sharp, rigid distal end 148 for gripping an external surface. The cleats provide a smaller contact surface which contacts the external surface. This increases the contact pressure between the module and the external surface. It will be appreciated that the portion of the cleats that contact the external surface (distal end 148) may also be made of or provided with a coating of a high friction material such as rubber or the like. It will be appreciated that, in accordance with such an embodiment, the foot 146 may be of any design that provides a smaller and, optionally, point, contact area with the external surface.

Figure 5A:
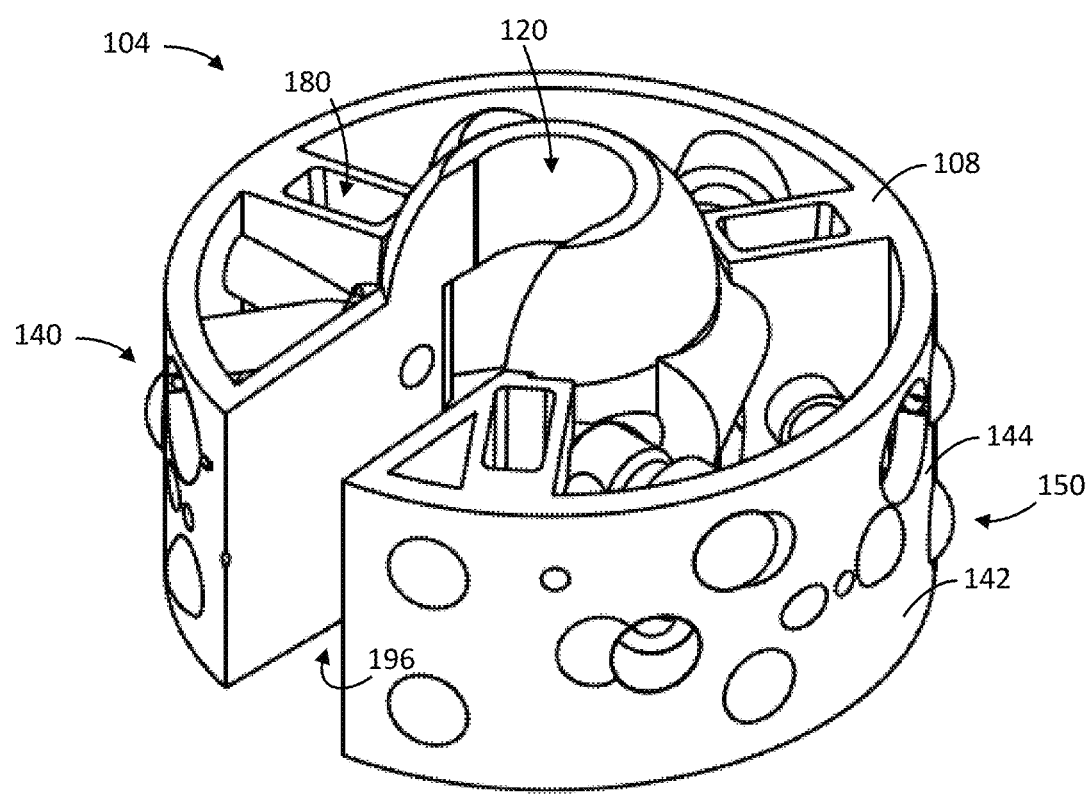
FIG. 5A shows a perspective view of a further alternative embodiment of a module.

Another example of external guide members 140 to increase friction between the external surface and the module 104 by providing a limited contact surface is shown in FIG. 5A. In the example illustrated in FIG. 5A, the external guide members 140 have an outer surface 142 with a face 144 with a textured surface 150 which may increase the friction exerted by the guide sleeve 100 on the external surface as the smaller contact area increases the contact pressure.

As a further example, not shown, to increase the friction exerted by the guide sleeve 100 on the external surface, the external guide members 140 may be configured as a frictional coating that may be applied to the outer sidewall 114 of the module 104. Any frictional coating known in the art may be used.

Figure 6A:
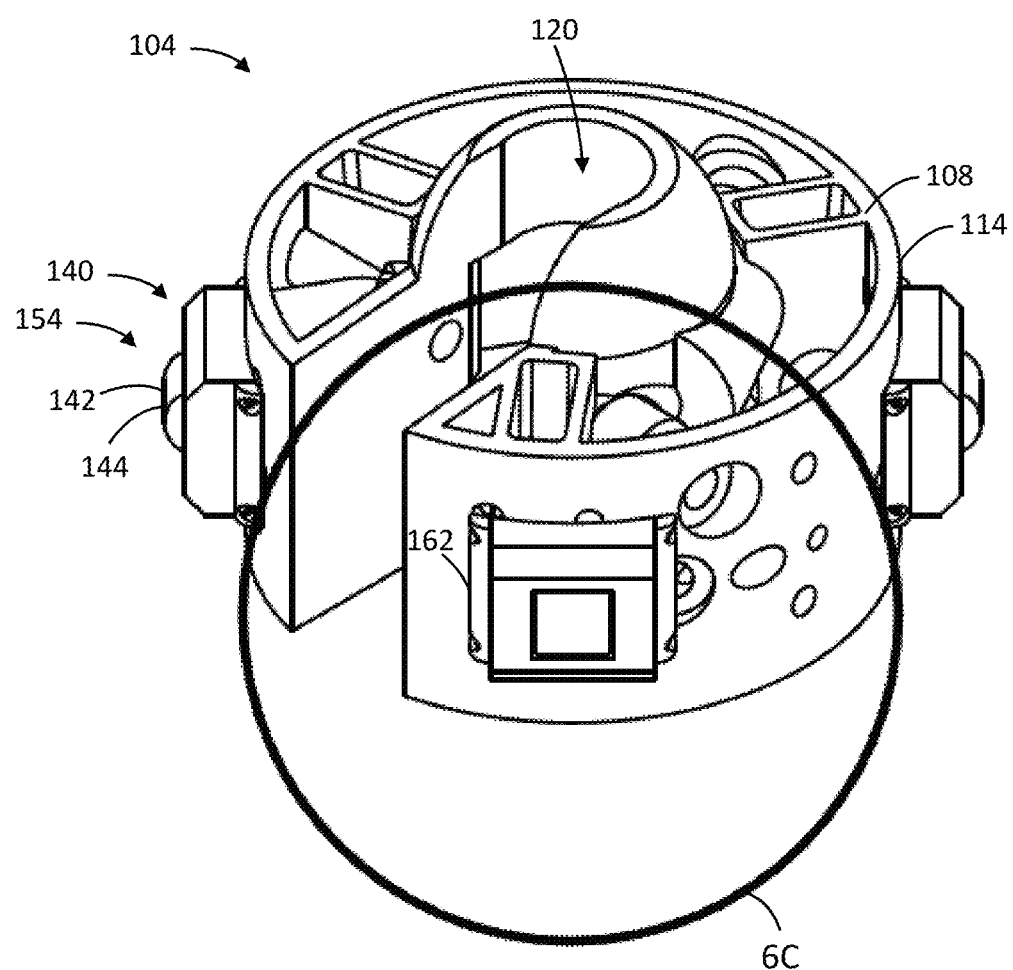
FIG. 6A shows a perspective view of a further alternative embodiment of a module.

Referring now to FIG. 6A, an example of external guide members 140 to reduce friction between the external surface and the module 104 is illustrated. In the example shown, the external guide members 140 include a plurality of rollers 154 which may move (e.g., roll) relative to, for example, the inner surface of a conduit, to reduce friction between the guide sleeve 100 and the conduit.

As with the internal guide members 130, the external guide members 140 may contact the external surface as the module travels through, e.g., a conduit or tunnel. The external guide members 140 may move relative to the external surface (e.g., roll) to reduce the amount of friction exerted on the module 104. Accordingly, optionally, the external guide members 140 are the only, or substantially the only, portion of the module 104 that contacts the external surface as the module 104 passes through the conduit or tunnel.

The external guide members 140 may be integrally formed with the outer sidewall 114 or may be attached to (optionally removably attached to), the module 104. For example, they may be attached to the outer sidewall 114 of the module 104 by any means known in the art.

Figure 5B:
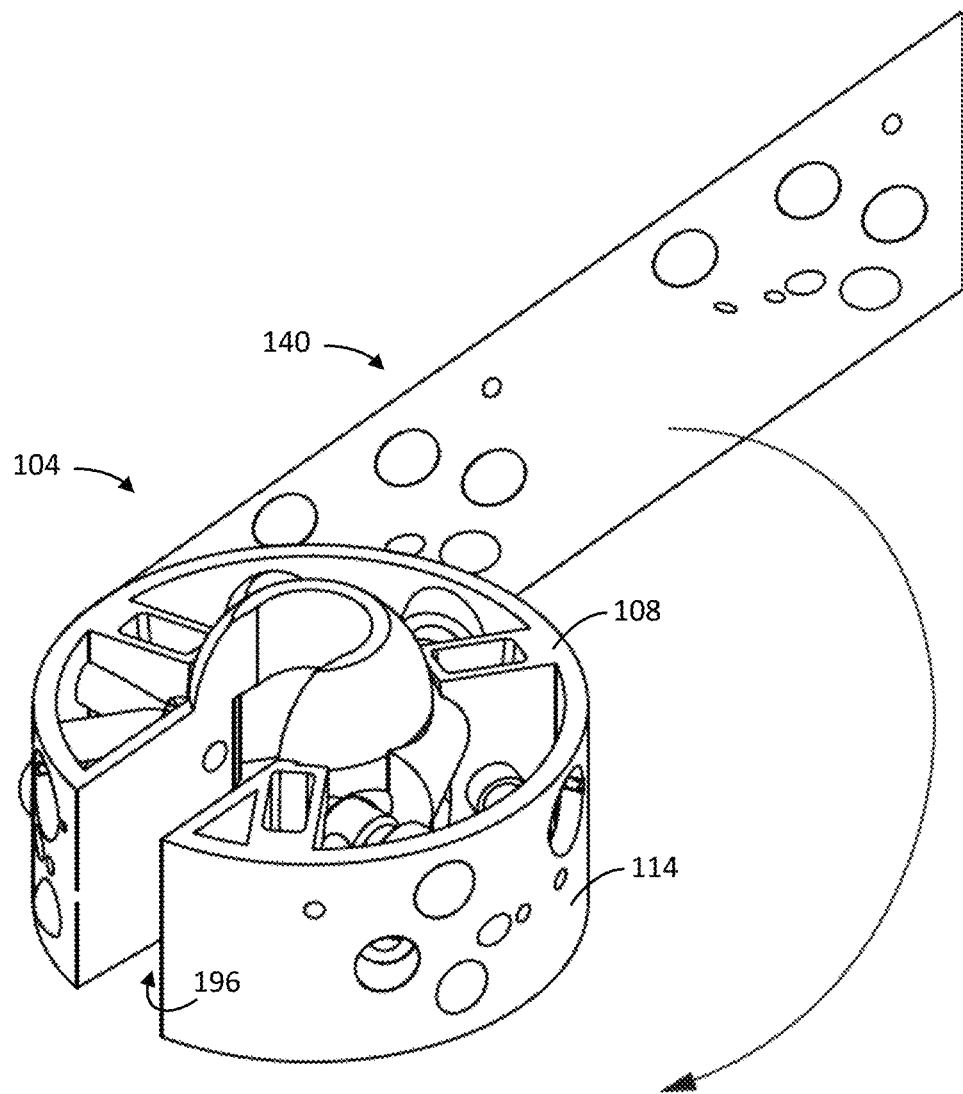
FIG. 5B shows a perspective view of the module of FIG. 5A, shown with external guide members being installed thereon.

For example, as shown in FIGS. 3C and 5B, the external guide members 140 comprise a continuous sheet that has feet 146 provided thereon. The sheet is wrapped around the exterior surface of the module and secured thereto by, e.g., an adhesive, welding or the like to secure the external guide members 140 to the outer sidewall 114. It will be appreciated that the sheet may be formed as a continuous annular member that is secured to the outer surface, such as by being press fitted thereon.

Figure 6B:
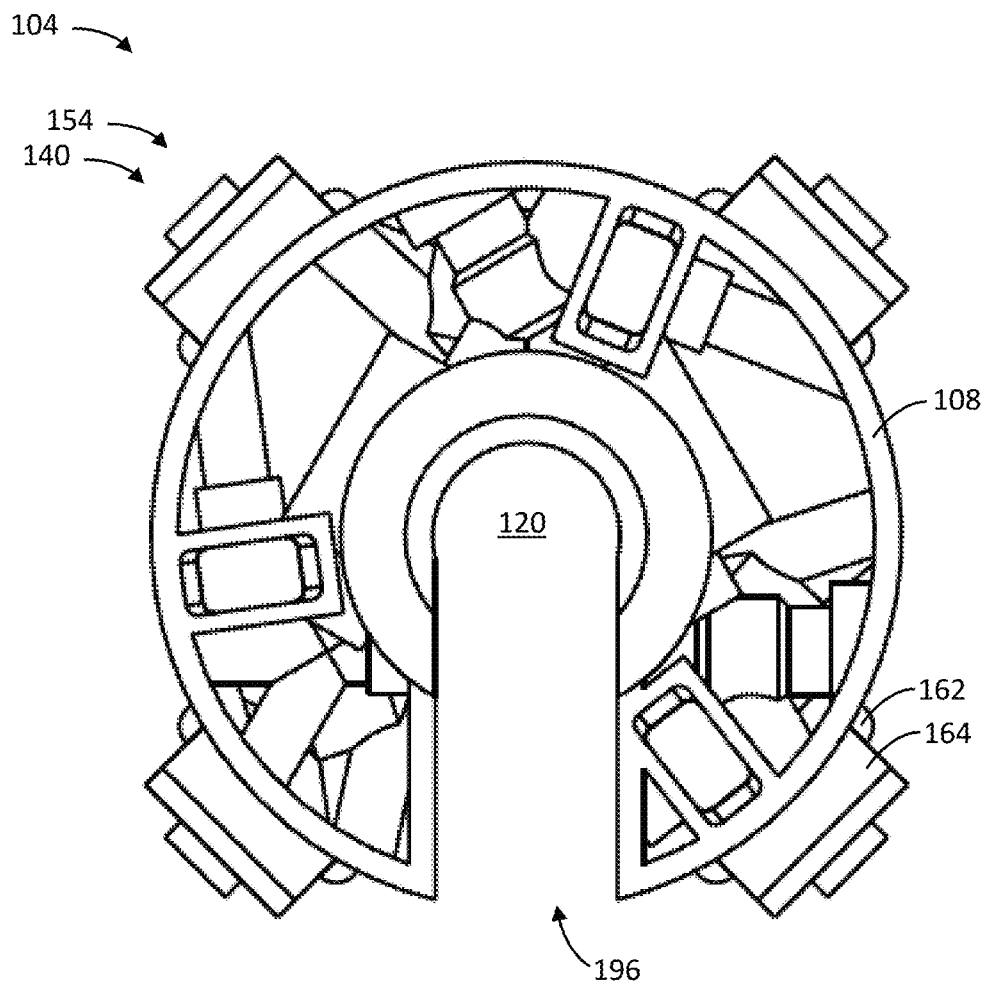
FIG. 6B shows a top view of the module of FIG. 6A.
Figure 6C:
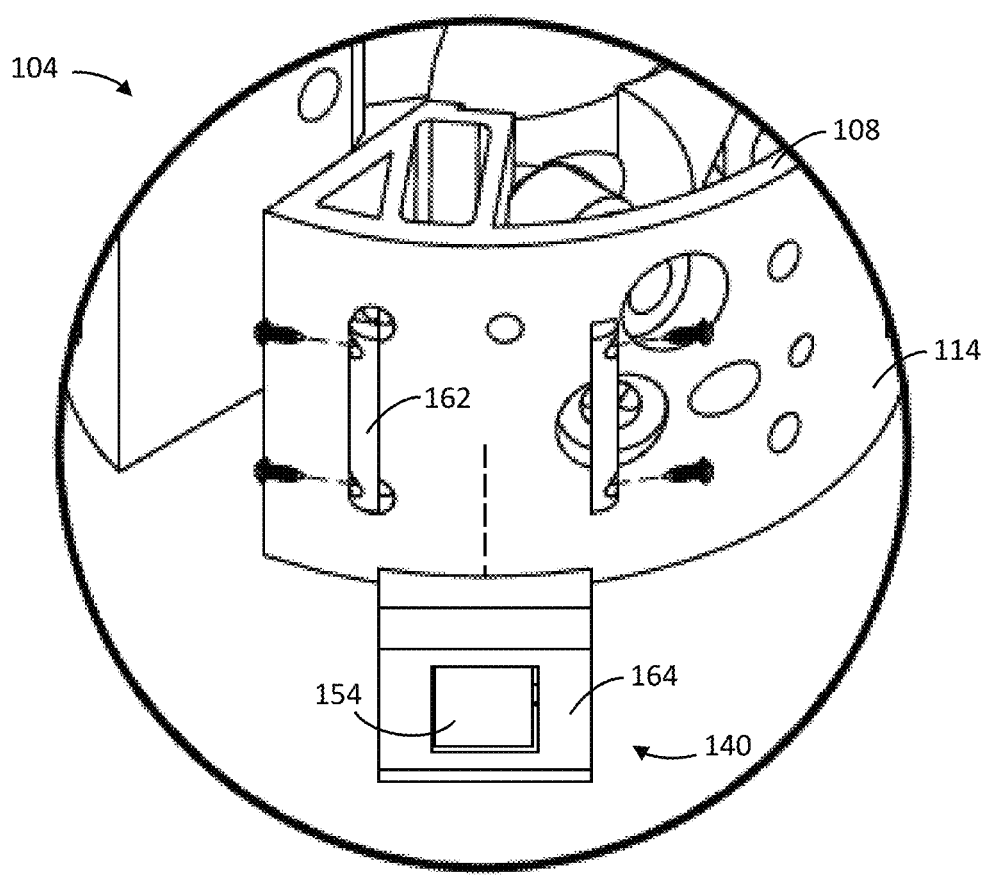
FIG. 6C shows an enlarged perspective view of region 6C in FIG. 6A, shown with external guide members being installed thereon.

As shown in FIG. 4C, the external guide members 140 may have a threaded end 158 which may be screwed into a corresponding threaded bore 160 in the outer sidewall 114 of the module 104. In the example illustrated in FIGS. 6B and 6C, the external guide members 140 may have a stationary support bracket 162 that is securable to the outer sidewall 114 of the module 104, and the roller 154 may be securable to the support bracket 162. More specifically, in the example illustrated in FIG. 6C, the roller 154 is rotatably mounted to a roller housing 164 and the roller housing 164 is securable to the support bracket 162. Accordingly, as exemplified, each of the external guide members 140 may be individually secured (optionally releasably secured) to module 104.

It will be appreciated that the external guide members 140 may be detachably attachable to the outer sidewall 114 of the module 104 so that the external guide members 140 may be interchanged according to the intended use of the guide sleeve 100 (i.e. whether the guide sleeve is intended to remain in position or if the guide sleeve is intended to move through, e.g., a conduit).

Figure 7:
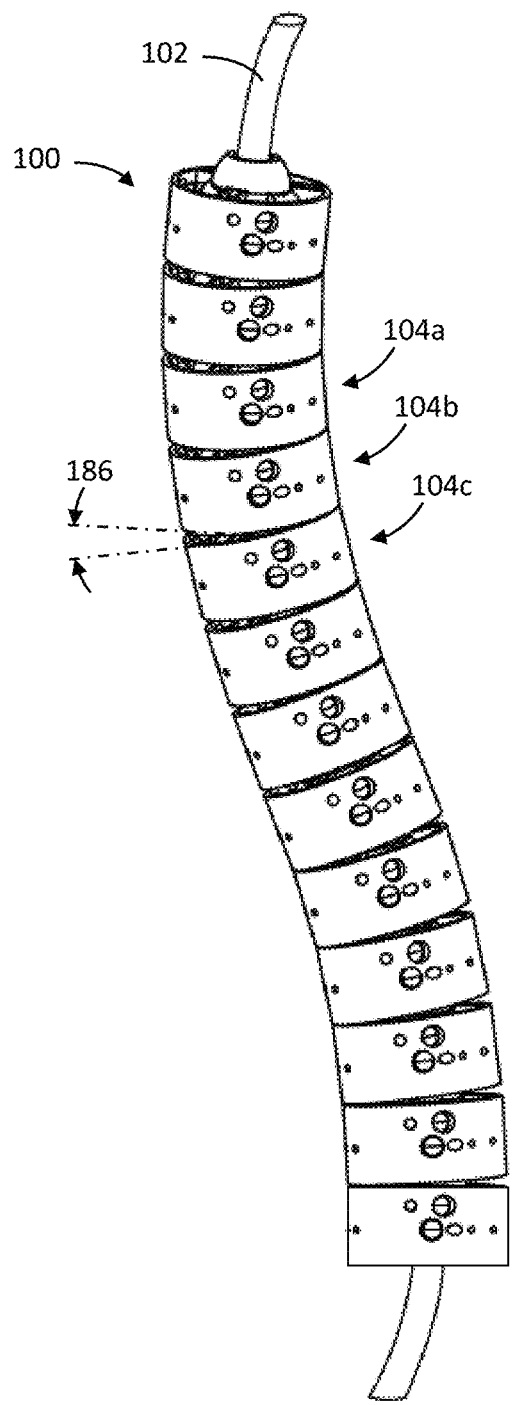
FIG. 7 shows a perspective view of a further alternative embodiment of a guide sleeve with a flexible linear member extending therethrough.

When a first module 104a is connected to an adjacent second module 104b, the first module 104a may be at least one of axially moveable with respect to the second module 104b and twistable with respect to the second module 104b so that the guide sleeve 100 may be bendable. That is, as shown in FIG. 7, the guide sleeve 100 may be bendable such that the first module 104a is moveable off axis with respect to the second module 104b.

The interconnection of modules 104 to be axially and, optionally, bendable connected to each other may be used by itself or in combination with the external guide members 140 and/or the internal guide members 130.

Figure 8:
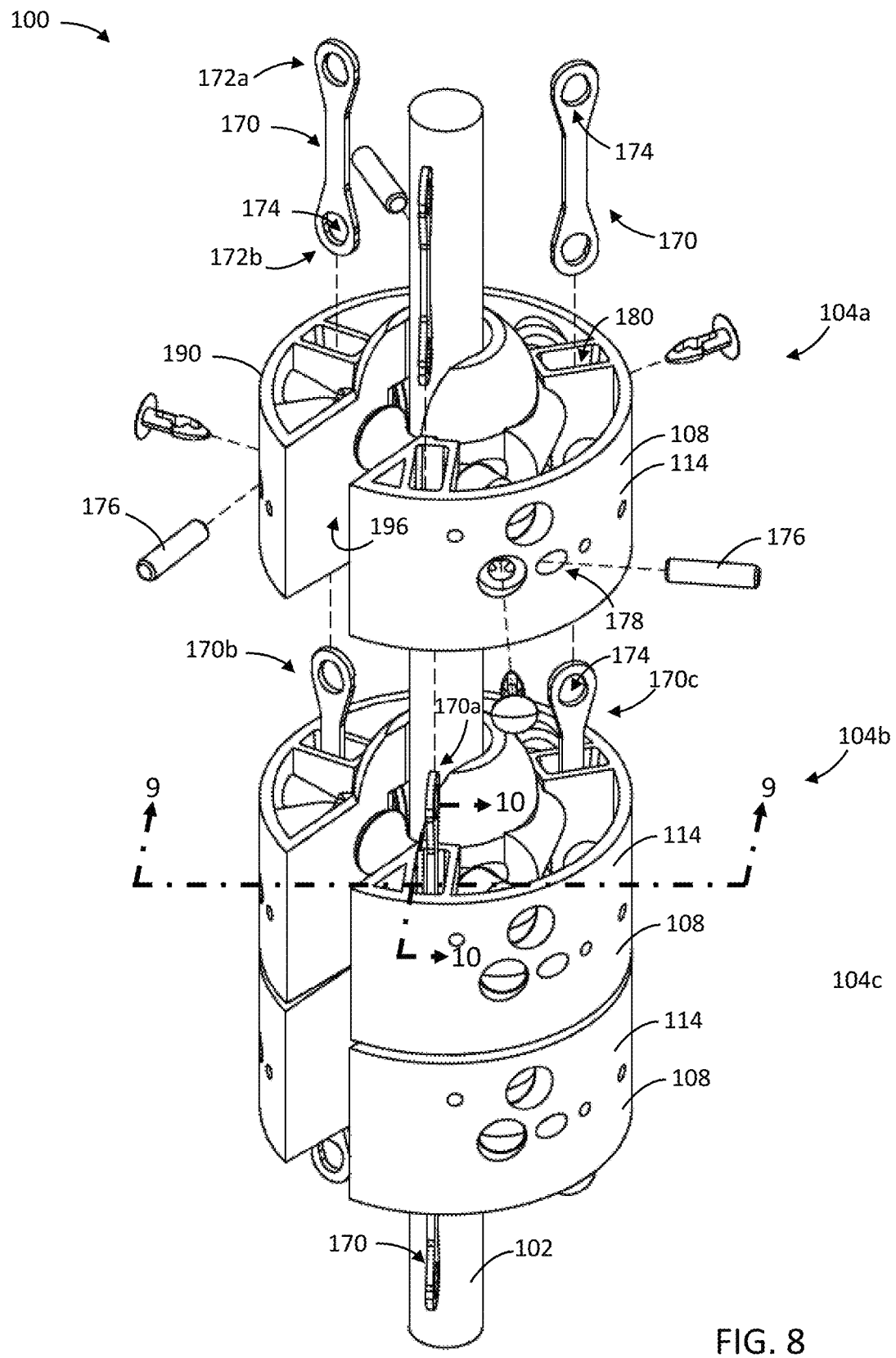
FIG. 8 shows a partially exploded perspective view of a portion of the guide sleeve and flexible linear member of FIG. 7.

As shown in FIG. 8, in the example illustrated, the first module 104a is connectable to the second module 104b by a plurality of axially extending linking members 170. Any number of linking members 170 may be used to connect adjacent modules 104. In the example illustrated, three linking members 170a, 170b, 170c connect the first module 104a to the second module 104b.

Figure 9:
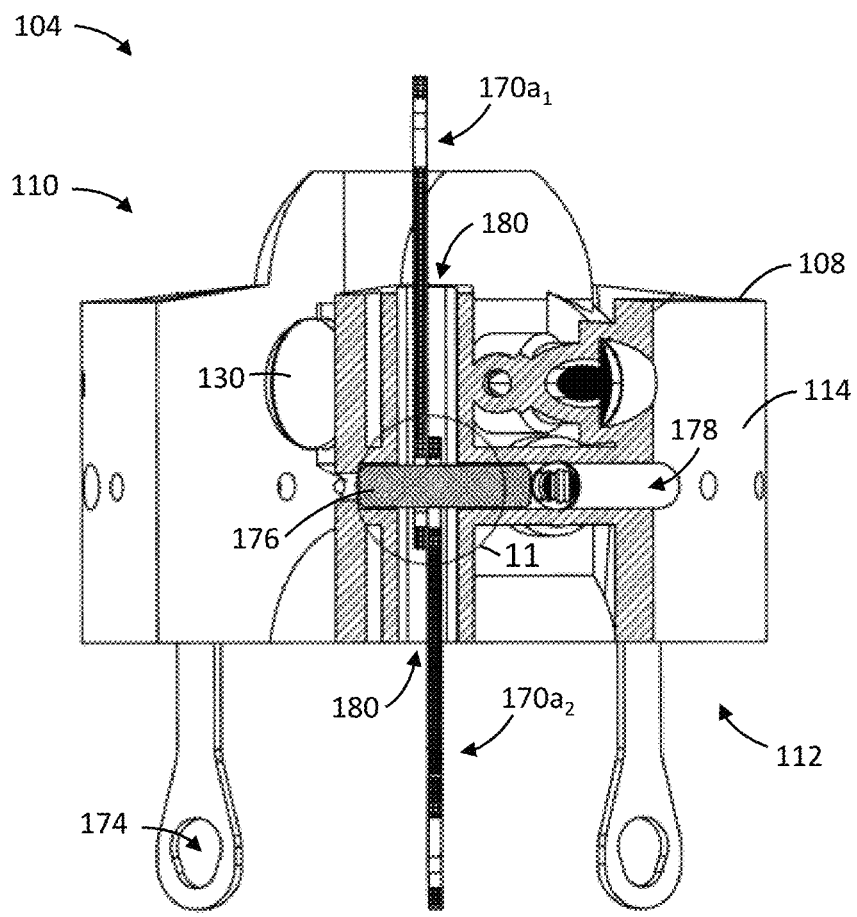
FIG. 9 shows a cross-sectional view of a module of the guide sleeve of FIG. 8, taken along line 9-9 in FIG. 8.

As shown in FIG. 8, each of the linking members 170 has an axially extending body with an aperture 174 at each axially opposed end. Referring now to FIG. 9, a pin 176 may be securable within a bore 178 of the main body 108 of the module 104 and may pass through a respective aperture 174 of a respective linking member 170 to secure that end 172 of the linking member 170 to the main body 108.

Optionally, as shown in FIG. 9, a single pin 176 may secure two linking members 170 to the main body 108 of a module 104. Accordingly, in the example illustrated in FIG. 9, a first linking member $170a_1$ of the two linking members shown may secure the module 104 illustrated to an adjacent upper module (not shown for illustrative purposes) and a second linking member $170a_2$ of the two linking members shown may secure the module 104 illustrated to an adjacent lower module (not shown for illustrative purposes).

As shown in FIG. 9, the bore 178 in the main body 108 for holding the pin 176 in place may extend to the outer sidewall 114 of the main body 108. Accordingly, linking members 170 may be selectively secured to the modules 104 as desired by the operator. That is, if a guide sleeve 100 includes, for example, ten modules 104, and it is desired to add an eleventh module 104, the operator may connect an eleventh module 104 to the guide sleeve 100 by adding linking members 170 between the tenth and eleventh module 104 without (a) having to disassemble the entire guide sleeve 100; or (b) obtain a new guide sleeve having the desired number of modules 104. For example, if the operator wants to add the top linking member shown in FIG. 8, then the operator may remove the pin in the top connected to module 104 (the second from the bottom) and insert linking members 170. For example, the top connected module could be the module 104 of FIG. 9. The operator may remove the pin 176 securing the descending linking members 170 (e.g., linking member $170a_2$) in position. The ascending linking members (e.g., linking member $170a_1$) may then be inserted into position and the pin 176 may then be reinserted through apertures 174 of both descending and ascending pairs of linking members to secure the lower end of the ascending linking members in position. The opposed upper ends of the ascending linking members may then be inserted into the top most module 104 of FIG. 9 as it is lowered into position and a pin 176 inserted through apertures 174 to secure the top most module 104 in position.

Figure 10:
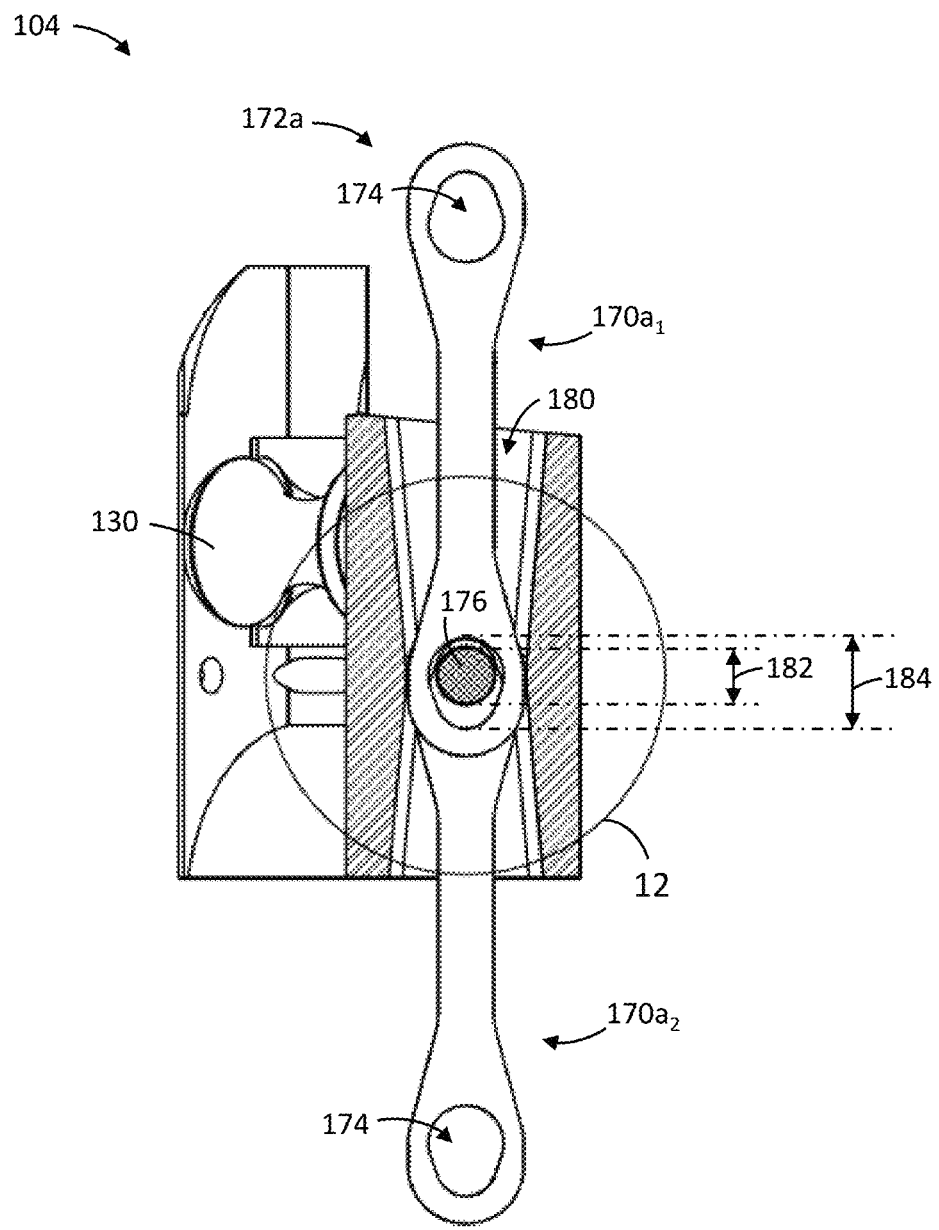
FIG. 10 shows a cross-sectional view of a portion of a module of the guide sleeve of FIG. 8, taken along line 10-10 in FIG. 8.
Figure 11A:
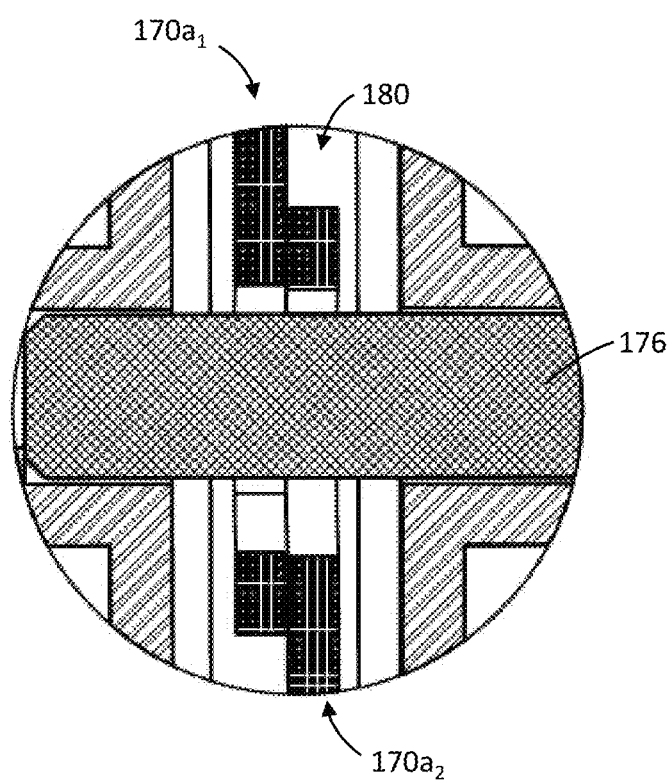
FIG. 11A shows an enlarged view of region 11 in FIG. 9.
Figure 11B:
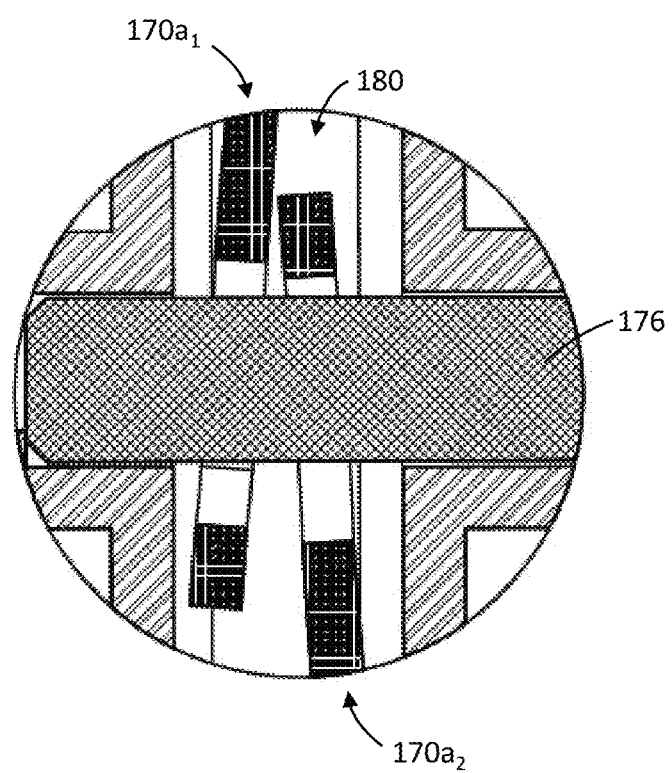
FIG. 11B shows an enlarged view of region 11 in FIG. 9, shown with linking members in a twisted position
Figure 11C:
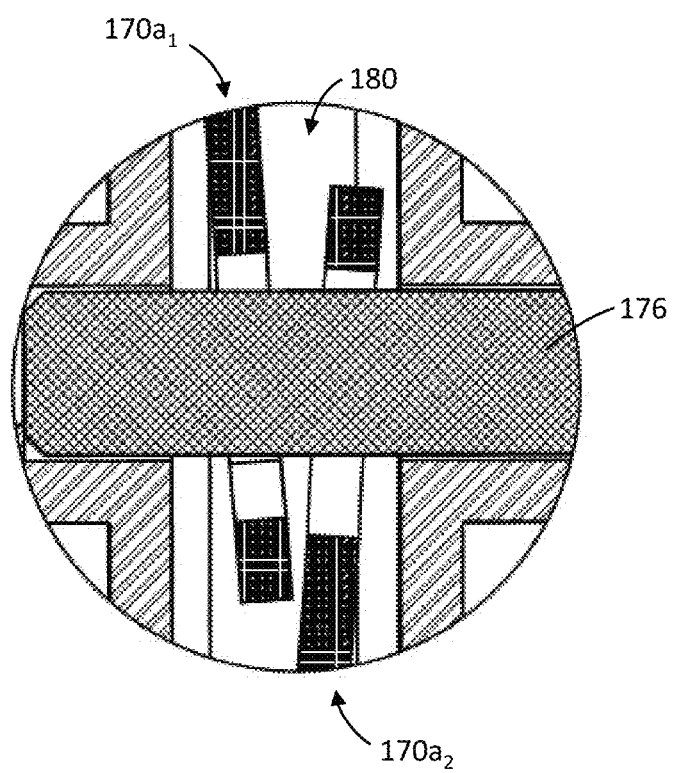
FIG. 11C shows an enlarged view of region 11 in FIG. 9, shown with linking members in an alternative twisted position.
Figure 12A:
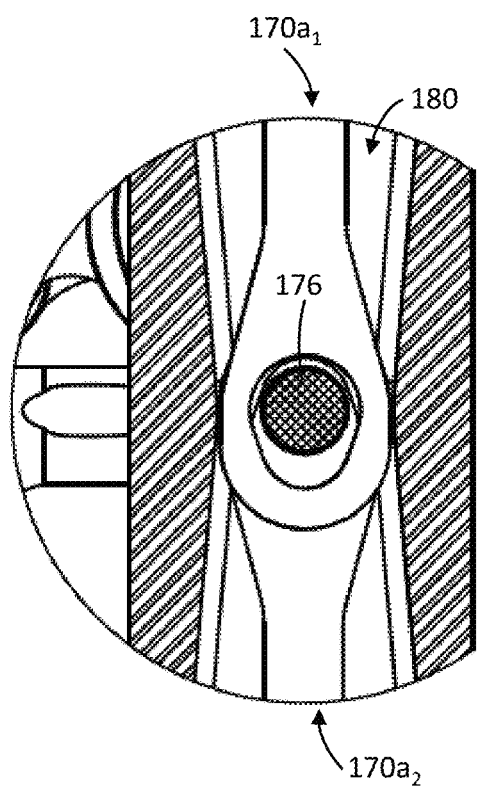
FIG. 12A shows an enlarged view of region 12 in FIG. 10.
Figure 12B:
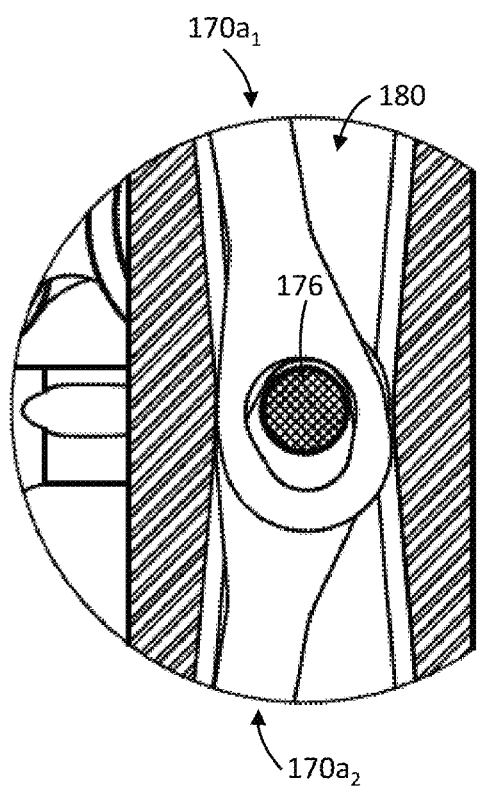
FIG. 12B shows an enlarged view of region 12 in FIG. 10, shown with linking members in a rotated position.
Figure 12C:
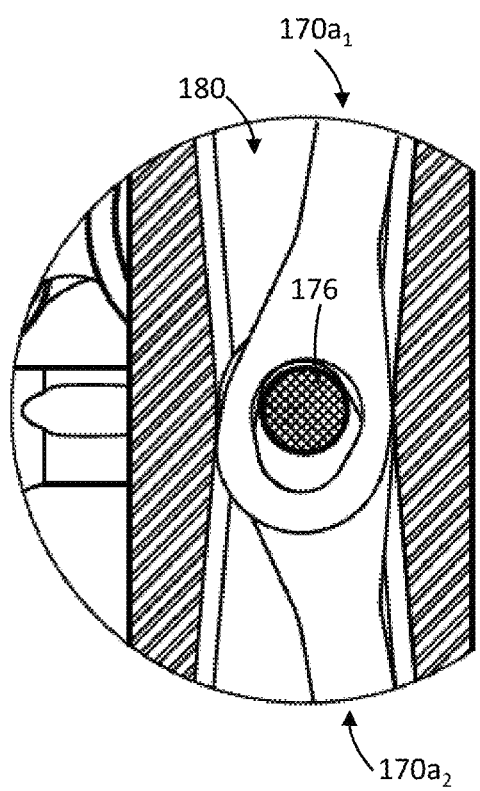
FIG. 12C shows an enlarged view of region 12 in FIG. 10, shown with linking members in an alternative rotated position.

Referring now to FIG. 10, the aperture 174 in the ends 172 of the linking members 170 may have a cross-sectional area that is greater than the cross-sectional area of the pins 176. Alternately or in addition, the passage 180 in the main body 108 through which the linking members 170 may axially extend may also have a greater cross-sectional area that than cross-sectional area of the linking members 170 to allow for rotating, axial movement, and/or twisting of the linking members 170 relative to the pins 176. Accordingly, the linking members 170 may be rotatable (e.g., rotatable left and right as exemplified in FIGS. 12B-12C), moveable axially, and/or twistable (e.g., twistable left and right in the view of FIG. 9 as exemplified in FIGS. 11A-11C) relative to the pins 176 when secured by the pins 176.

It will be appreciated that if the linking members 170 securing the first module 104a to the second module 104b are moveable relative to the pins 176 securing those linking members 170 to those modules 104a, 104b, then the first module 104a may be axially moveable with respect to the second module 104b.

The axial length of the aperture 174 compared to the axial diameter of the pin 176 may determine the magnitude of axial movement between adjacent modules 104. That is, if the pins 176 of a guide sleeve 100 have a diameter 182 of X and the apertures 174 of the linking members 170 connecting adjacent modules 104 have an axial length 184 of X+Y, then the modules 104 may be axially moveable relative to each other by a distance of 2Y (provided the length of the linking members 170 between the apertures 174 is at least 2Y greater than the distance between respective pins 176 of adjacent modules 104).

A similar relationship between the cross-sectional area of the linking members 170 and the cross-sectional area of the passages 180 in the main body 108 through which the linking members 170 may extends to the twistability of adjacent modules 104 also exists. For example, the greater the radial width of the passages 180 (in the direction from left to right in FIG. 10), then the greater the amount one module 104 may rotate with respect to another module 104. Similarly, for example, the greater the angular width of the passages 180 (in the direction from left to right in FIG. 11A), then the greater the amount one module 104 may twist with respect to another module 104.

It will be appreciated that if the modules have male and female members 122, 124, then the male and female members 122, 124 may enable the modules to rotate and/or twist with respect to each other and may also limit the amount by which the modules 104 may rotate and/or twist with respect to each other.

The amount adjacent modules 104 may axially move relative to each other for a given pair of male and female members 122, 124 may affect the maximum bend angle 186 (see e.g., FIG. 7) of the guide sleeve 100. Accordingly, linking members 170 which provide greater axial movement between adjacent modules 104 may be substituted with linking members 170 which provide relatively less axial movement between adjacent modules 104 if a greater bend angle 186 is desired. The desired bend angle 186 may depend on the type of flexible linear member to be supported by the guide sleeve 100. The cumulative bend angle between each adjacent pair of modules 104 in the guide sleeve 100 may define a bend radius (i.e., the bendability) of the guide sleeve 100.

It will be appreciated that each main body 108 may be an annular body with an internal opening and a flexible linear member 102 may be inserted through the internal openings of a guide sleeve. Alternately, one or more of the main bodies 108 may be openable to enable a flexible linear member 102 to be slid (e.g., radially moveable) into the internal opening.

Figure 13:
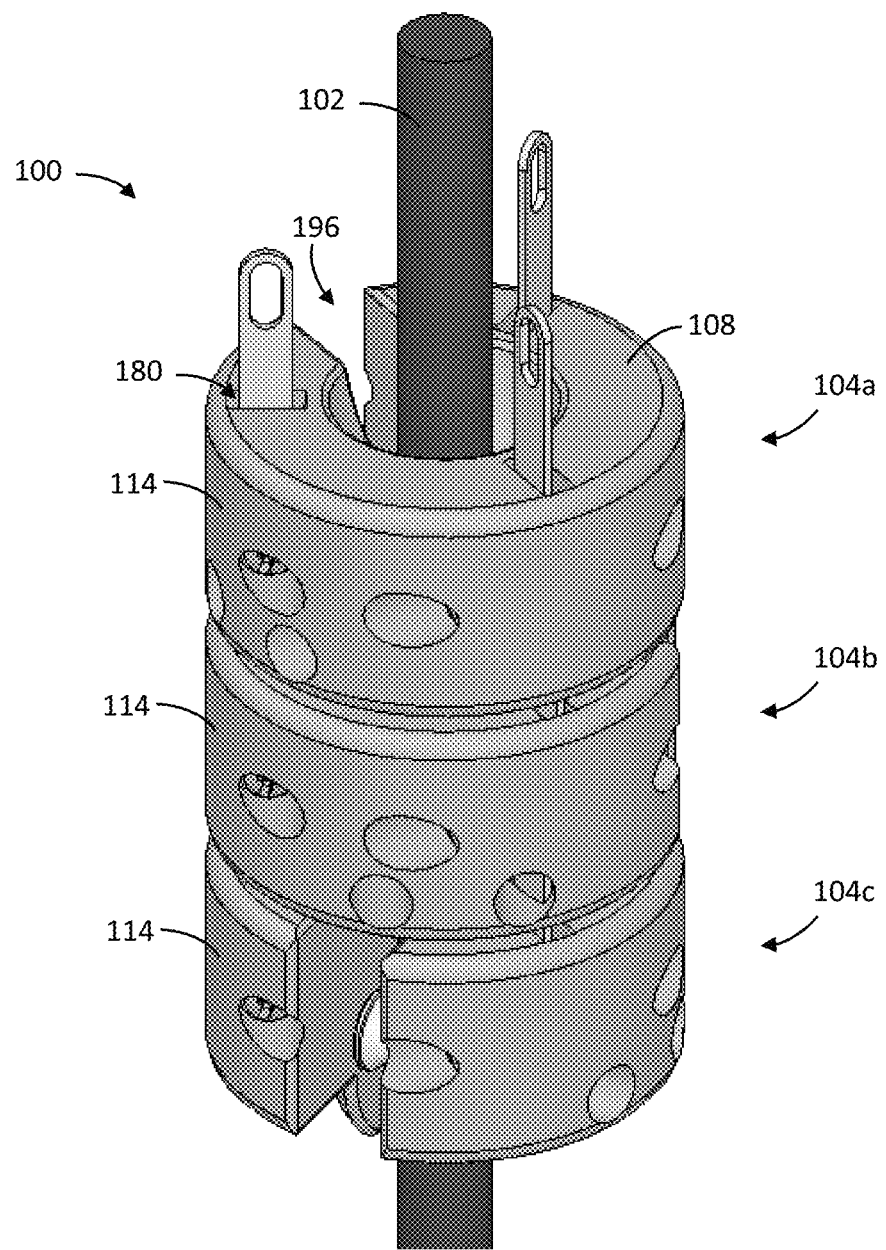
FIG. 13 shows a perspective view of a further alternative embodiment of a guide sleeve with a flexible linear member extending therethrough.

It may be desirable for the main body 108 to be openable so that the module 104 may be installable around a portion of a flexible linear member 102 without having to thread an end 194 of that flexible linear member 102 axially through the internal opening 120 (see for example FIG. 13).

For example, the main body may comprise two or more members wherein one member is moveable with respect to another (e.g., the main body may comprise two body parts that are pivotally mounted to each other so as to be pivotally openable). For example, the main body may comprise a first body section that may be a 180° sector and a second body section may be a 180° sector which, when secured in a closed position, define an annular main body with the internal opening.

Alternately, the main body 108 may comprise two or more members wherein at least one of the members is removable (e.g., laterally or radially) to provide access to the internal opening.

Figure 14A:
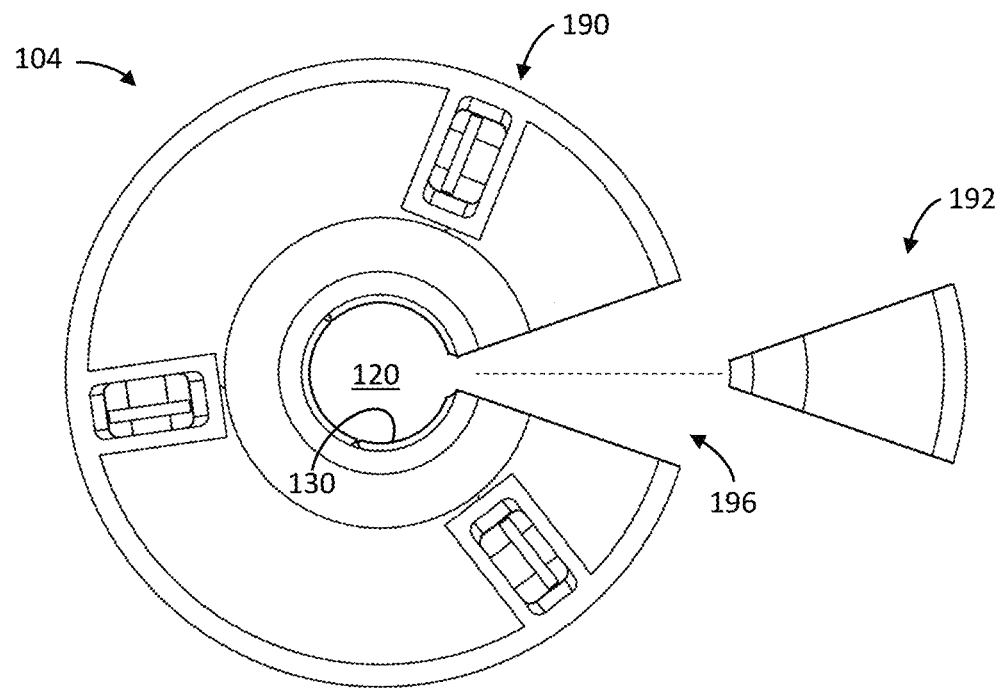
FIG. 14A shows a top view of a further alternative embodiment of a module.
Figure 14B:
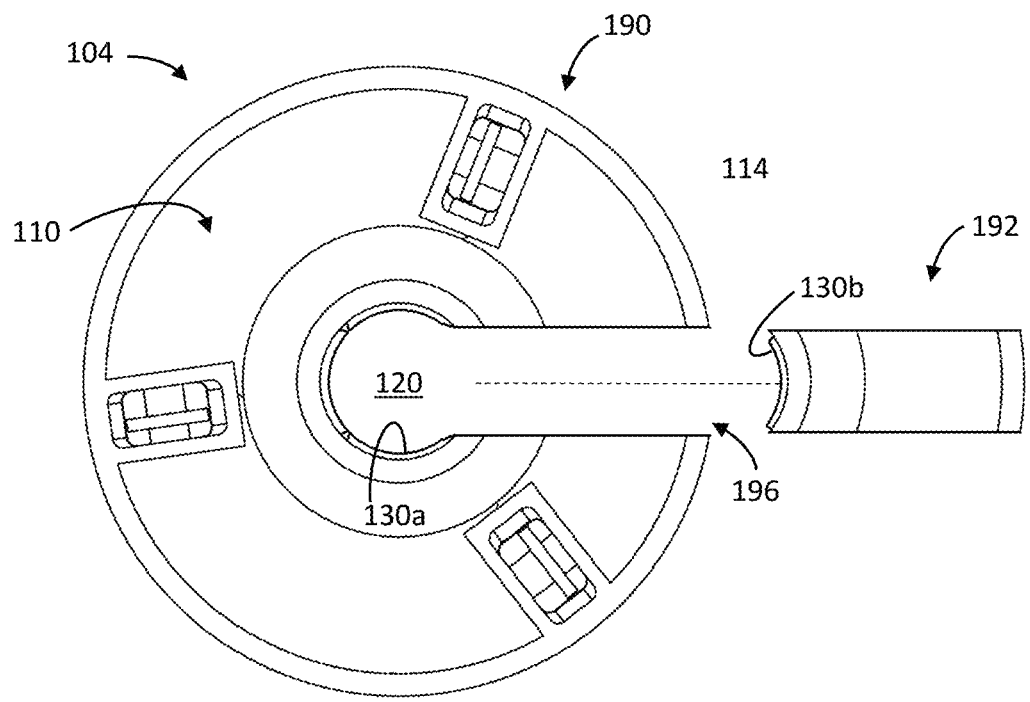
FIG. 14B shows a top view a further alternative embodiment of a module.
Figure 15:
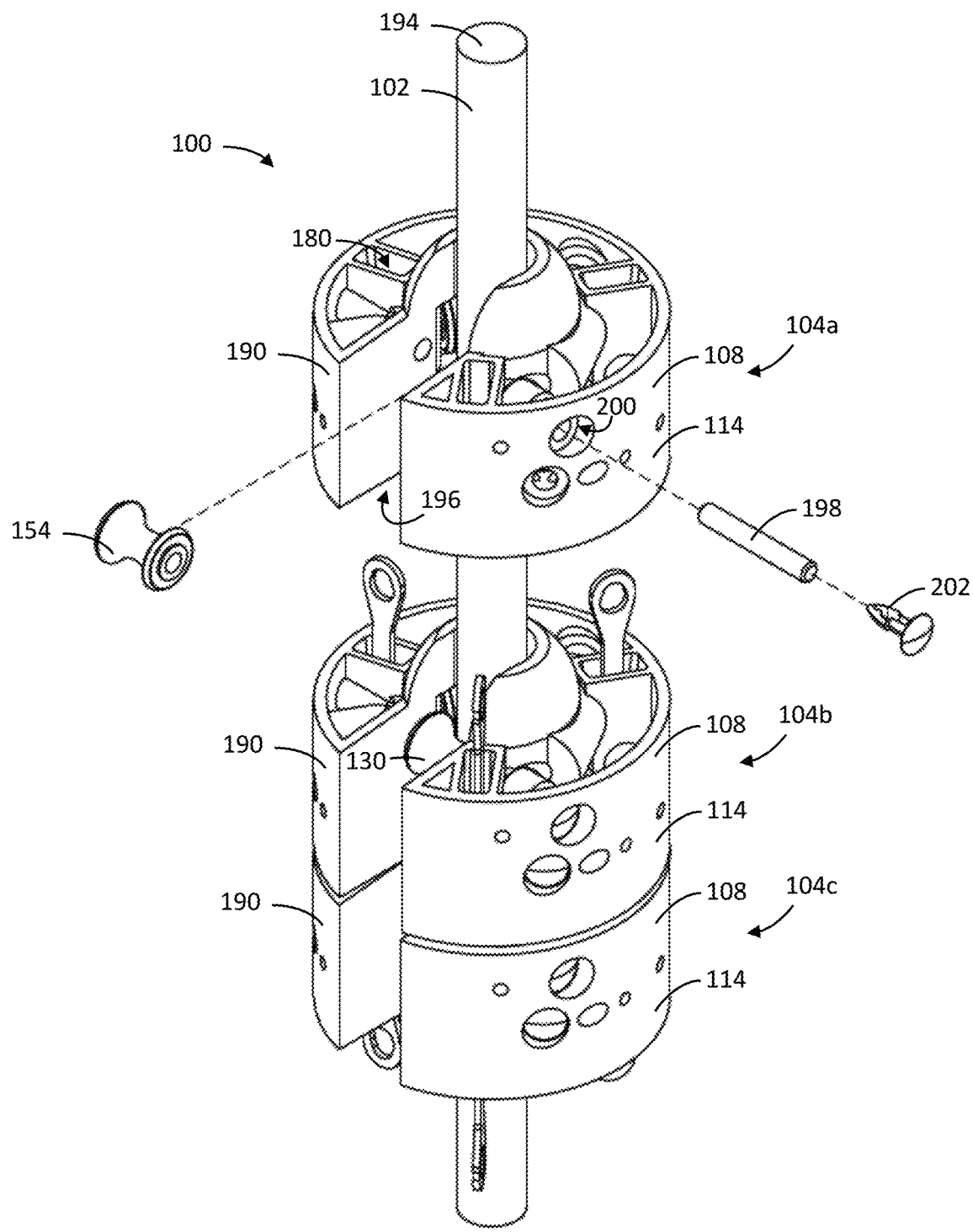
FIG. 15 shows a partially exploded perspective view of the guide sleeve and flexible linear member of FIG. 1B.

For example, as exemplified in FIGS. 14A and 14B, the module 104 comprises a first axially extending body section 190 and a second axially extending body section 192. The first body section 190 has a generally U-shaped recess 196 which, as exemplified in FIG. 14A is a generally pie shaped recess 196. When the second body section 192 is removed, the flexible linear member 102 may be slid into the recess 196. The second axially extending body section 192 may then be inserted into the recess 196 whereby the flexible linear member 102 is secured in position. Accordingly, when the first and second body sections 190, 192 are connected together, the first and second body sections 190, 192 define the internal opening 120.

In some examples, each of the first body section 190 and the second body section 192 may include a set of the internal guide members 130. Alternatively, only one of the first and second body sections 190, 192 may include internal guide members 130.

In the example illustrated in FIG. 14B, the generally U-shaped recess 196 has generally parallel opposed facing sides. As shown, the generally U-shaped recess 196 may extend radially inwardly from an outer perimeter (i.e., outer sidewall 114) of the module 104. Optionally, the U-shaped recess 196 extends axially between the first and second axially spaced apart opposed ends 110, 112.

In the example illustrated in FIG. 14B, the second axially extending body section 192 includes a roller 154 and is radially removably receivable in the U-shaped recess 196 of the module 104 shown therein. Accordingly, in the example illustrated, the first axially extending body section 190 has a first internal guide member 130a and the second axially extending body section 192 has a second internal guide member 130b.

Alternately, instead of providing a second axially extending body section 192, the flexible linear member 102 may be secured in position by using one or more rollers 154 (see for example, FIG. 13 wherein a single roller is used. As shown, the roller 154 may be receivable by a generally U-shaped recess 196 in the first body section 190. As exemplified, the roller 154 may be securable to the first body section 190 by an axle 198 that is insertable into the first body section 190 through a bore 200 in the outer sidewall 114 of the first body section 190. As shown, a plug 202 may optionally hold the axle 198 in the bore 200.

Optionally, as shown in FIG. 8, the passages 180 through which the linking members 170 may extend may be equally spaced about the perimeter of the modules 104. In the example illustrated, the passages 180 are spaced 120° apart. Spacing the passages 180 an equal distance apart about the perimeter of the modules 104 may allow for the relative orientation of adjacent modules 104 to vary. For example, as shown in FIG. 13, the second module 104b may be rotated relative to the first module 104a, which may be rotated relative to the third module 104c. Arranging adjacent modules 104 so they are rotated relative to each other may increase the overall strength of the guide sleeve 100 if the modules 104 do not have uniform strength about their perimeter (e.g., a recess 196 is provided).

Optionally, in any embodiment, the guide sleeve 100 may be used when pulling flexible linear members 102 underwater. Accordingly, in some examples, the modules 104 may have at least one fillable void space (not shown) in which a buoyancy adjusting member may be inserted. The buoyancy adjusting member may be any buoyancy adjusting member known in the art (solid, liquid, or gas). It may be desirable to insert a buoyancy adjusting member into a fillable void so that the guide sleeve 100 not only protects the flexible linear member 102 during installation, but also assists the installer (human or robot) by reducing the apparent weight of the flexible linear member 102 and the guide sleeve 100.

Alternately, or in addition, the main body 108 of the module 104 may be made of a buoyant material. However, it is to be understood that the main body 108 may be made of any material known in the art.

While the main body 108 of the module 104 is only illustrated as being circular in transverse section, it is to be understood that the main body 108 may be any shape in transverse section, e.g., triangular in transverse section or rectangular (including square) in transverse section.

While the above description has discussed the guide sleeve 100 as an assembly, it is to be understood that the guide sleeve 100 may be provided as a kit having any of the parts described above.

Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:
1. A kit for forming a guide sleeve for a flexible linear member comprising:
   (a) a plurality of modules comprising a first module and a second module wherein, when assembled and the modules are linearly arrayed and the guide sleeve extends along a longitudinal axis, each module comprising an axial extending main body comprising:
      (i) first and second axially spaced apart opposed ends and an outer sidewall;
      (ii) an axial extending internal opening extending between the first and second axially spaced apart opposed ends;
      (iii) internal guide members associated with the internal opening, wherein the internal opening is configured such that the flexible linear member can travel axially through the internal opening and contact the internal guide members, and the internal guide members are configured to move relative to the flexible linear member whereby friction between the internal guide members and the flexible linear member can be reduced; and
      (iv) external guide members associated with the outer sidewall, the external guide members:
         (1) have an outer surface comprising a face that has a shape configured to fit in an inner surface of a conduit and either:
            (a) comprises a textured surface and a frictional coating, whereby the outer surface is configured such that contact between the face and the inner surface of the conduit can inhibit the modules from travelling through the conduit as the flexible linear member travels through the modules, or
            (b) are moveably mounted with respect to the modules and whereby the external guide members are configured to move relative to the inner surface of the conduit as the guide sleeve travels through the conduit whereby friction between the module and the inner surface of the conduit can be reduced; and
   (b) a plurality of axially extending linking members, wherein, when the first module is connected to the second module, the linking members connect the first and second modules and enable the first module to move axially with respect to the second module and the guide sleeve is bendable whereby the first module is moveable off axis with respect to the second module.

2. The kit of claim 1, wherein the first of the opposed ends has a male member and the second of the opposed ends has a female member, and when the first module is connected to the second module, the male member of the first module is receivable in the female member of the second module.

3. The kit of claim 2, wherein the male member and the female member provide a ball and socket interface between the first and second modules.

4. The kit of claim 1, wherein, when the linking members are connected to the first module, the linking members are axially moveable relative to the first module.

5. The kit of claim 4, wherein, when the linking members are connected to the second module, the linking members are axially moveable relative to the second module.

6. The kit of claim 1, wherein the internal guide members comprise a surface configured to rotate relative to the flexible linear member as the flexible linear member travels axially through the internal opening.

7. The kit of claim 6, wherein the internal guide members comprise rollers.

8. The kit of claim 1, wherein the external guide members are moveably mounted with respect to the modules and the external guide members comprise a surface that is configured to rotate relative to the inner surface of the conduit as the guide sleeve travels through the conduit.

9. The kit of claim 8, wherein the external guide members comprise rollers.

10. The kit of claim 1, wherein the outer surface comprises the textured surface and the frictional coating.

11. The kit of claim 1, wherein each module comprises a first axially extending body section and a second axially extending body section, wherein, when the first and second axially extending body sections are connected together, the first and second axially extending body sections define the internal opening.

12. The kit of claim 11, wherein the first axially extending body section comprises a recess in which the second axially extending body section is laterally receivable.

13. The kit of claim 11, wherein the first axially extending body section has a first set of the internal guide members and the second axially extending body section has a second set of the internal guide members.

14. The kit of claim 1, wherein each module comprises an axially extending body section having a generally U-shaped recess that extends radially inwardly from an outer perimeter of the respective module, the generally U-shaped recess extends axially between the first and second axially spaced apart opposed ends, the first axially extending body section has a first set of the internal guide members, and a second set of the internal guide members is removably receivable in the generally U-shaped recess.

15. The kit of claim 1, wherein the modules have at least one fillable void space whereby a buoyancy adjusting member is insertable into the at least one fillable void space.

16. The kit of claim 1, wherein, when the first and second modules are assembled and aligned, a longitudinal axis extends through a center of the first and second modules and the first module is rotatable 120° clockwise around the longitudinal axis with respect to the second module.

17. The kit of claim 1, wherein when the first module is connected to the second module, the linking members define a maximum bend angle between the first module and the second module whereby the first module is moveable off axis with respect to the second module to an extent limited by the maximum bend angle.

18. A kit for forming a guide sleeve for a flexible linear member comprising:
 (a) a plurality of modules comprising a first module and a second module wherein, when assembled and the modules are linearly arrayed and the guide sleeve extends along a longitudinal axis, each module comprising an axial extending main body comprising:
  (i) first and second axially spaced apart opposed ends, and an outer sidewall;
  (ii) an axial extending internal opening extending between the first and second axially spaced apart opposed ends; and
  (iii) internal rollers associated with the internal opening, wherein the internal opening is configured such that as the flexible linear member travels axially through the internal opening, the internal rollers rotate relative to the flexible linear member; and
 (b) a plurality of axially extending linking members, wherein, when the first module is connected to the second module, the linking members connect the first and second modules and enable the first module to move axially with respect to the second module and the guide sleeve is bendable whereby the first module is moveable off axis with respect to the second module.

19. The kit of claim 18, wherein each first end has a male member and each second end has a female member, and when the first module is connected to the second module, the male member of the first module is receivable in the female member of the second module and provides a ball and socket interface between the first and second modules.

20. The kit of claim 18, further comprising external guide members associated with the outer sidewall of each module.

21. The kit of claim 20, wherein the external guide members have an outer surface comprising a face that has a shape configured to fit in an inner surface of a conduit, a textured surface, and a frictional coating, whereby the outer surface is configured such that contact between the face and the inner surface of the conduit can inhibit the modules from travelling through the conduit as the flexible linear member travels through the modules.

22. The kit of claim 20, wherein the external guide members are moveably mounted with respect to the modules whereby the external guide members are configured to move relative to an inner surface of the conduit as the guide sleeve travels through the conduit whereby friction between the module and the inner surface of the conduit can be reduced.

23. The kit of claim 22, wherein the external guide members comprise rollers.

24. The kit of claim 18, wherein when the first module is connected to the second module, the linking members define a maximum bend angle between the first module and the second module whereby the first module is moveable off axis with respect to the second module to an extent limited by the maximum bend angle.

25. A guide sleeve for a flexible linear member comprising:
 (a) a plurality of modules comprising a first module and a second module, each module comprising an axial extending main body comprising:
  (i) first and second axially spaced apart opposed ends, and an outer sidewall;
  (ii) an axial extending internal opening extending between the first and second axially spaced apart opposed ends;
  iii) internal guide members associated with the internal opening, wherein the internal opening is configured such that the flexible linear member can travel axially through the internal opening and contact the internal guide members, and the internal guide members are configured to move relative to the flexible linear member whereby friction between the internal guide members and the flexible linear member can be reduced; and (iv) external guide members associated with the outer sidewall wherein, the external guide members:
  (1) have an outer surface comprising a face that has a shape configured to fit in an inner surface of a conduit and either:
    (a) comprises a textured surface and a frictional coating, whereby the outer surface is configured such that contact between the face and the inner surface of the conduit can inhibit the modules from travelling through the conduit as the flexible linear member travels through the modules, or
    (b) are moveably mounted with respect to the modules and whereby the external guide members are configured to move relative to the inner surface of the conduit as the guide sleeve travels through the conduit whereby friction between the module and the inner surface of the conduit can be reduced; and (b) a plurality of axially extending linking members wherein, when the first module is connected to the second module, the linking members connect the first and second modules and enable the first module to move axially with respect to the second module.

26. The guide sleeve of claim 25, wherein the linking members are axially moveably mounted to the first module.

27. The guide sleeve of claim 25, wherein the modules have at least one fillable void space whereby a buoyancy adjusting member is insertable into the at least one fillable void space.

28. The guide sleeve of claim 25, wherein the external guide members have the textured surface and the frictional coating, whereby the outer surface is configured such that contact between the face and the inner surface of the conduit can inhibit the modules from travelling through the conduit as the flexible linear member travels through the modules.

29. The guide sleeve of claim 25, wherein the external guide members are moveably mounted with respect to the modules and whereby the external guide members are configured to move relative to the inner surface of the conduit as the guide sleeve travels through the conduit whereby friction between the module and the inner surface of the conduit can be reduced.

30. The guide sleeve of claim 29, wherein the external guide members comprise rollers.

31. The guide sleeve of claim 25, wherein when the first module is connected to the second module, the linking members define a maximum bend angle between the first module and the second module whereby the first module is moveable off axis with respect to the second module to an extent limited by the maximum bend angle.

* * * * *